(12) United States Patent
Hirayama et al.

(10) Patent No.: US 7,234,661 B2
(45) Date of Patent: Jun. 26, 2007

(54) DRAG ADJUSTMENT DEVICE FOR A DUAL-BEARING REEL

(75) Inventors: Hirokazu Hirayama, Sakai (JP); Masakazu Iwabuchi, Tondabayashi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/169,648

(22) Filed: Jun. 30, 2005

(65) Prior Publication Data

US 2006/0016924 A1    Jan. 26, 2006

(30) Foreign Application Priority Data

Jul. 21, 2004 (JP) ............................. 2004-213155
Aug. 24, 2004 (JP) ............................. 2004-243752
Dec. 13, 2004 (JP) ............................. 2004-359574

(51) Int. Cl.
*A01K 89/033* (2006.01)

(52) U.S. Cl. ...................... 242/303; 242/306

(58) Field of Classification Search ............... 242/290, 242/291, 302–308, 270, 271, 245, 246
See application file for complete search history.

(56) References Cited

U.S. PATENT DOCUMENTS

| | | | | |
|---|---|---|---|---|
| 2,417,732 A | * | 3/1947 | Bland et al. ................ 242/255 |
| 3,315,913 A | * | 4/1967 | Grieten ....................... 242/271 |
| 3,425,644 A | * | 2/1969 | Griste ......................... 242/270 |
| 4,422,600 A | * | 12/1983 | Preston ...................... 242/271 |
| 5,297,756 A | * | 3/1994 | Ikuta .......................... 242/270 |
| 5,318,246 A | * | 6/1994 | Ikuta .......................... 242/303 |
| 5,348,247 A | * | 9/1994 | Kaneko ....................... 242/303 |
| 5,601,245 A | * | 2/1997 | Hashimoto .................. 242/260 |
| 6,045,073 A | * | 4/2000 | Ikuta .......................... 242/260 |
| 6,164,576 A | * | 12/2000 | Takahashi .................... 242/271 |
| 6,422,497 B1 | * | 7/2002 | Kyon .......................... 242/267 |
| 6,578,785 B1 | * | 6/2003 | Hong .......................... 242/245 |
| 6,769,639 B2 | * | 8/2004 | Koelewyn et al. .......... 242/246 |
| 6,805,313 B2 | * | 10/2004 | Nilsen ......................... 242/303 |
| 2005/0211812 A1 | * | 9/2005 | Nakagawa et al. .......... 242/223 |
| 2006/0016924 A1 | * | 1/2006 | Hirayama et al. ........... 242/245 |

FOREIGN PATENT DOCUMENTS

JP          60-72172          5/1985

* cited by examiner

*Primary Examiner*—Gene O. Crawford
*Assistant Examiner*—Evan Langdon
(74) *Attorney, Agent, or Firm*—Global IP Counselors, LLP

(57) ABSTRACT

A drag adjustment device for a dual-bearing reel that adjusts the drag force of a lever drag mechanism includes a drag adjustment lever, an intermediate positioning mechanism and a drag adjustment sounding mechanism. The drag adjustment lever is pivotably attached to the reel unit about a spool shaft between a free position corresponding to a drag free state and a maximum position corresponding to a maximum drag state of the lever drag mechanism. The intermediate positioning mechanism includes a positioning block that is attached to the reel unit at the intermediate position between the free position and the maximum position so as to be able to advance or retreat. The positioning block contacts the drag adjustment lever to position the drag adjustment lever at the intermediate position. The drag adjustment sounding mechanism sounds in response to the pivoting of the drag adjustment lever.

8 Claims, 12 Drawing Sheets

DRAG ADJUSTMENT DEVICE FOR A DUAL-BEARING REEL

CROSS-REFERENCE TO RELATED APPLICATIONS

This application claims priority to Japanese Patent Application Nos. 2004-213155, 2004-243752 and 2004-359574. The entire disclosures of Japanese Patent Application Nos. 2004-213155, 2004-243752 and 2004-359574 are hereby incorporated herein by reference.

BACKGROUND OF THE INVENTION

1. Field of the Invention

The present invention generally relates to an adjustment device. More specifically, the present invention relates to a drag adjustment device for a dual-bearing reel that adjusts the drag force of a lever drag mechanism to apply a braking force to a spool in the dual-bearing reel.

2. Background Information

Generally, a dual-bearing reel is furnished with a drag mechanism which brakes the rotation of a spool in the line releasing direction. Among drag mechanisms, a lever drag mechanism has excellent operability and drag adjusting accuracy in contrast with a star drag mechanism. Thus, the lever drag mechanism is commonly applied to large-sized dual-bearing reels.

Conventionally, a drag adjustment device, which adjusts the drag force of the lever drag mechanism, has a drag adjustment lever, a moving mechanism and a sounding mechanism. The drag adjustment lever is pivotably attached to a reel unit. The moving mechanism moves a spool shaft in the axial direction by the pivoting of the drag adjustment lever. The sounding mechanism emits sound in response to the pivoting of the drag operating lever to provide a clicking feeling. (See, for example, Japanese Publication No. S60-72172.)

The drag adjustment lever is pivotably attached to the reel unit from a free position, where the drag force is not applied. The spool can freely rotate to a maximum position, where the drag force is the maximum. The sounding mechanism sounds in the whole pivoting range of the drag operating lever. The sounding mechanism has an interlocking disk, which is attached to the reel unit, and a ball, which is provided in the drag adjustment lever. A plurality of sounding holes with which the ball collides is formed in the interlocking disk. When the drag adjustment lever is operated, the ball collides with the sounding holes and thus emits sound.

Among dual-bearing reels with this type of lever drag mechanism, a reel having a strike position that is set to the extent of one-third the tensile strength of the fishing line is known. The strike position is one example of an intermediate position and is between the free position and the maximum position of the drag adjustment lever. An intermediate positioning mechanism is provided in order to position the drag adjustment lever at the strike position.

The intermediate positioning mechanism includes a positioning block which is attached to the reel unit at the strike position between the free position and the maximum position so as to be able to advance or retreat. The intermediate positioning mechanism further includes a spring member, which urges the positioning block in an advance direction. The intermediate positioning mechanism allows the positioning block to contact the drag adjustment lever so as to position the drag adjustment lever at the strike position when the drag adjustment lever is pivoted from the free position to the strike position. The intermediate positioning mechanism allows the positioning block to retreat by utilizing an angler's finger or thumb, which operates the drag adjustment lever. In the operation for pressing the positioning block, the angler is required to move a part of his finger or thumb off the drag adjustment lever and press the positioning block with the same part of the finger or thumb to cause the positioning block to retreat. Accordingly, even if the resistance applied to the drag adjustment lever is constant, the angler feels a force for operation increase.

In the conventional construction, generally, the angler rarely operates the drag adjustment lever between the strike position and the maximum position. However, since the sounding mechanism is configured to sound in the entire drag adjustment range, the resistance for sounding or providing a clicking feeling rises. In the case where such resistance rises, particularly in the operation for pressing the positioning block, the angler feels that the force for operation further increases due to resistance produced by the sounding mechanism since the angler moves a part of his fingers and thumb off of the drag adjustment lever. This disturbs lever operation and causes difficult operation of the drag adjustment lever toward the maximum position.

In view of the above, it will be apparent to those skilled in the art from this disclosure that there exists a need for an improved drag adjustment device that operates without causing difficult operation of a drag adjustment lever. This invention addresses this need in the art as well as other needs, which will become apparent to those skilled in the art from this disclosure.

SUMMARY OF THE INVENTION

An object of the present invention is to provide a drag adjustment device of a lever drag mechanism which is less prone to disturb lever operation in the operation for pressing a positioning block. Another object of the present invention is to provide a drag adjustment device that emits a sound without disturbing drag lever operation. Still yet another object of the present invention is to provide a clicking feeling without disturbing drag lever operation.

A drag adjustment device for a dual-bearing reel according to a first aspect of the present invention has a drag adjustment lever, an intermediate positioning mechanism and a drag adjustment sounding mechanism. The drag adjustment lever is configured and arranged to pivot about a spool shaft of a spool between a free position and a maximum position. The free position corresponds to a drag free state where the spool can freely rotate. The maximum position corresponds to a maximum drag state of a lever drag mechanism. The intermediate positioning mechanism includes a positioning block and a spring member. The positioning block is configured and arranged to be attached to a region of a reel unit at an intermediate position, which is between the free position and the maximum position, so as to be able to advance or retreat. The spring member urges the positioning block in an advance direction. The intermediate positioning mechanism allows the positioning block to contact the drag adjustment lever so as to position the drag adjustment lever at the intermediate position when the drag adjustment lever is pivoted from the free position to the intermediate position. The positioning block is further configured and arranged to be pressed inward by a finger or thumb that operates the drag adjustment lever. The drag adjustment sounding mechanism includes a plurality of sound-emitting recessed portions, a sound-emitting pin and a spring member. The sound-emitting recessed portions are configured and arranged to oppose the drag adjustment lever and to be disposed in the reel unit so as to be spaced from each other at an interval in the pivot direction from the free position to the maximum position except in a region of the reel unit where the positioning block is configured and arranged to be pressed inward by the finger or thumb that operates the drag adjustment lever. The sound-emitting pin is attached to the drag adjustment lever so as to be able to oppose the sound-emitting recessed portions and to advance or retreat. The spring member urges the sound-emitting pin toward the sound-emitting recessed portions. The drag adjustment sounding mechanism sounds in response to the pivoting of the drag adjustment lever.

The drag adjustment lever is positioned in the intermediate position by the intermediate positioning mechanism. When the drag adjustment lever is operated from the intermediate position to the maximum position, the drag adjustment lever is released by the positioning block. In order to release the drag adjustment lever, the angler operates the drag adjustment lever toward the maximum position, while pressing the positioning block with the finger or thumb that operates the drag adjustment lever. During the pivoting operation, the sound-emitting pin repeatedly collides with the sound-emitting recessed portions to emit sound. The sound-emitting recessed portions are provided from the free position to the maximum position except in the region where the positioning block can retreat. Accordingly, the sound-emitting pin does not sound in the region where the sound-emitting recessed portions are not provided and the positioning block can retreat. In this construction, a sound is not emitted from the free position to the maximum position in the region where the positioning block is able to retreat, but is emitted in another region. Accordingly, resistance due to the collision of the sound-emitting pin with the sound-emitting recessed portions does not arise in the region where the positioning block can retreat. Therefore, even in the operation for pressing a positioning block, the force for operation corresponding to the resistance due to the sounding mechanism does not increase; thus, lever operation is less prone to be disturbed. In addition, a sound is emitted and a clicking feeling is provided except in the region where the positioning block is able to retreat.

The drag adjustment device for a dual-bearing reel according to a second aspect of the present invention is the drag adjustment device according to the first aspect of the present invention, wherein the positioning block retreats by pressing the drag adjustment lever when the drag adjustment lever is operated from the maximum position toward the free position. In the case where the drag adjustment lever is operated from the free position toward the maximum position, the drag adjustment lever is positioned at the intermediate position. The drag adjustment lever is pivoted to the maximum position by pressing the positioning block with the angler's finger or thumb. When the drag adjustment lever is operated from the maximum position toward the free position, the positioning block retreats even when the drag adjustment lever is returned at the intermediate position. Thus, the drag adjustment lever is returned to the free position without stopping at the intermediate position. Therefore, the drag adjustment lever is quickly operated from the maximum position to a position beyond the intermediate position.

The drag adjustment device for a dual-bearing reel according to a third aspect of the present invention is the drag adjustment device according to the first or second aspect of the present invention, wherein the reel unit has a cylindrical reel body, a first side plate that covers one end of the reel body, a second side plate that covers another end of the reel body and to which the drag adjustment lever is pivotably attached, a plate-shaped lever guide that is attached to the second side plate so as to protrude in an arc shape externally in the radial direction and guide the drag adjustment lever by the protruding portion, the sound-emitting recessed portions are through holes that are formed in the lever guide so as to be spaced at an interval from each other in the pivot direction.

Formation of the sound-emitting recessed portions is facilitated since through holes are provided in the lever guide nearest to the drag adjustment lever as the sound-emitting recessed portions. In addition, since the lever guide is a plate member that protrudes in an arc shape, it is possible to emit a crisp sound.

The drag adjustment device for a dual-bearing reel according to a fourth aspect of the present invention is the drag adjustment device according to any of the first through third aspects of the present invention, wherein the drag adjustment device further comprises a moving mechanism for moving the spool in the axial direction relative to a rotary shaft of the spool by the pivoting of the drag adjustment lever. In this construction, moving the rotary shaft of the spool can adjust the drag force.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of one embodiment of the present invention is provided for illustration only and not for the purpose of limiting the invention as defined by the appended claims and their equivalents.

As used herein to describe the present invention, the following directional terms "forward, rearward, left, right, upward, downward, vertical, horizontal, above, below and transverse" as well as any other similar directional terms refer to those directions of a fishing rod equipped with the dual bearing reel in accordance with the present invention. Accordingly, these terms, as utilized to describe the present invention should be interpreted relative to a fishing rod equipped with the present invention from a viewpoint behind the fishing rod and the dual bearing reel.

Figure 1:
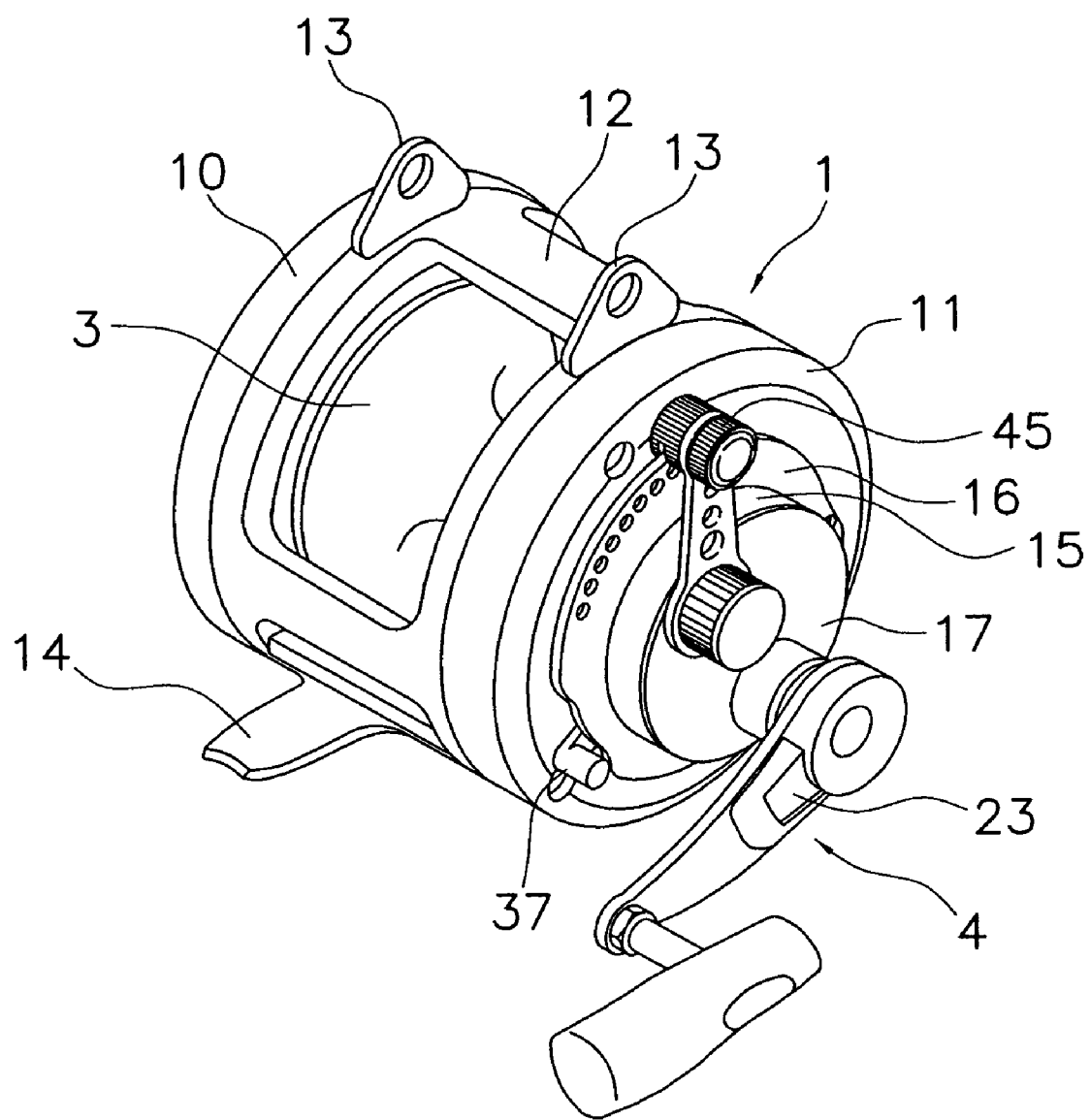
FIG. 1 is a perspective view of a dual-bearing reel equipped with a drag adjustment device in accordance with one embodiment of the present invention.
Figure 2:
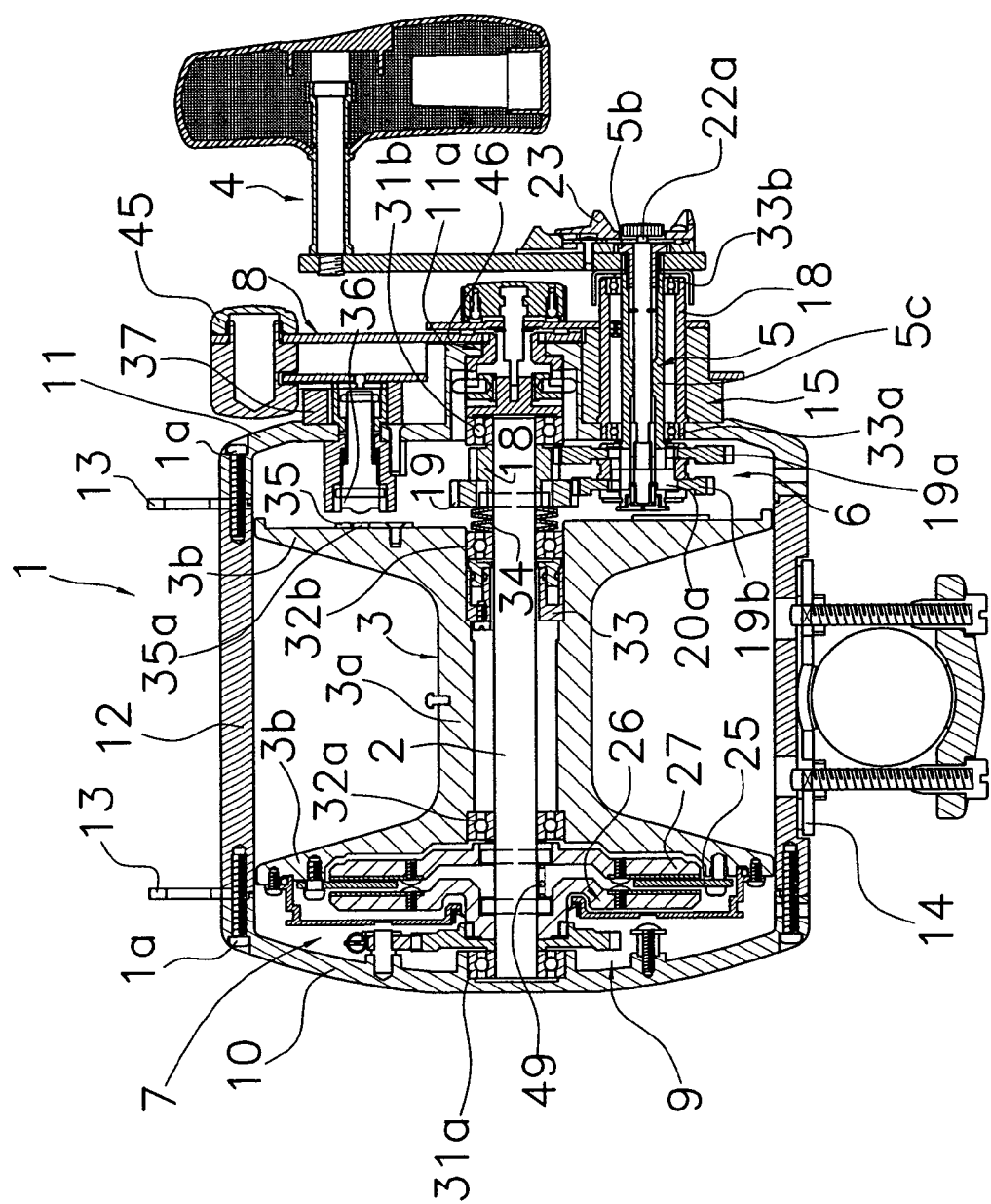
FIG. 2 is a cross sectional view of the dual-bearing reel illustrated in FIG. 1 equipped with the drag adjustment device in accordance with one embodiment of the present invention.

Referring initially to FIG. 1, a dual-bearing reel is illustrated in accordance with one embodiment of the present invention. The dual-bearing reel includes a cylindrical reel unit 1, a spool shaft 2, a spool 3 and a handle assembly 4. Referring to FIG. 2, the spool shaft 2 is rotatably mounted in a central part of the reel unit 1. The spool 3 is rotatably coupled to the spool shaft 2 and immovable in an axial direction of the spool shaft 2. The handle assembly 4 is disposed laterally on the reel unit 1 and includes a tubular handle shaft 5. Within an interior of the reel unit 1, the dual-bearing reel is furnished with a rotation transmission mechanism 6, a lever drag mechanism 7, a drag adjustment mechanism 8 and a reverse rotation check mechanism 9. The rotation transmission mechanism 6 transmits rotation from the handle assembly 4 to the spool 3. The lever drag mechanism 7 brakes a rotation of the spool 3 in the line-releasing direction. The drag adjustment mechanism 8 includes a drag adjustment lever 45 and adjusts the drag force of the lever drag mechanism 7. The reverse rotation check mechanism 9 controls rotation of the spool 3 in the line-releasing direction.

Figure 3:
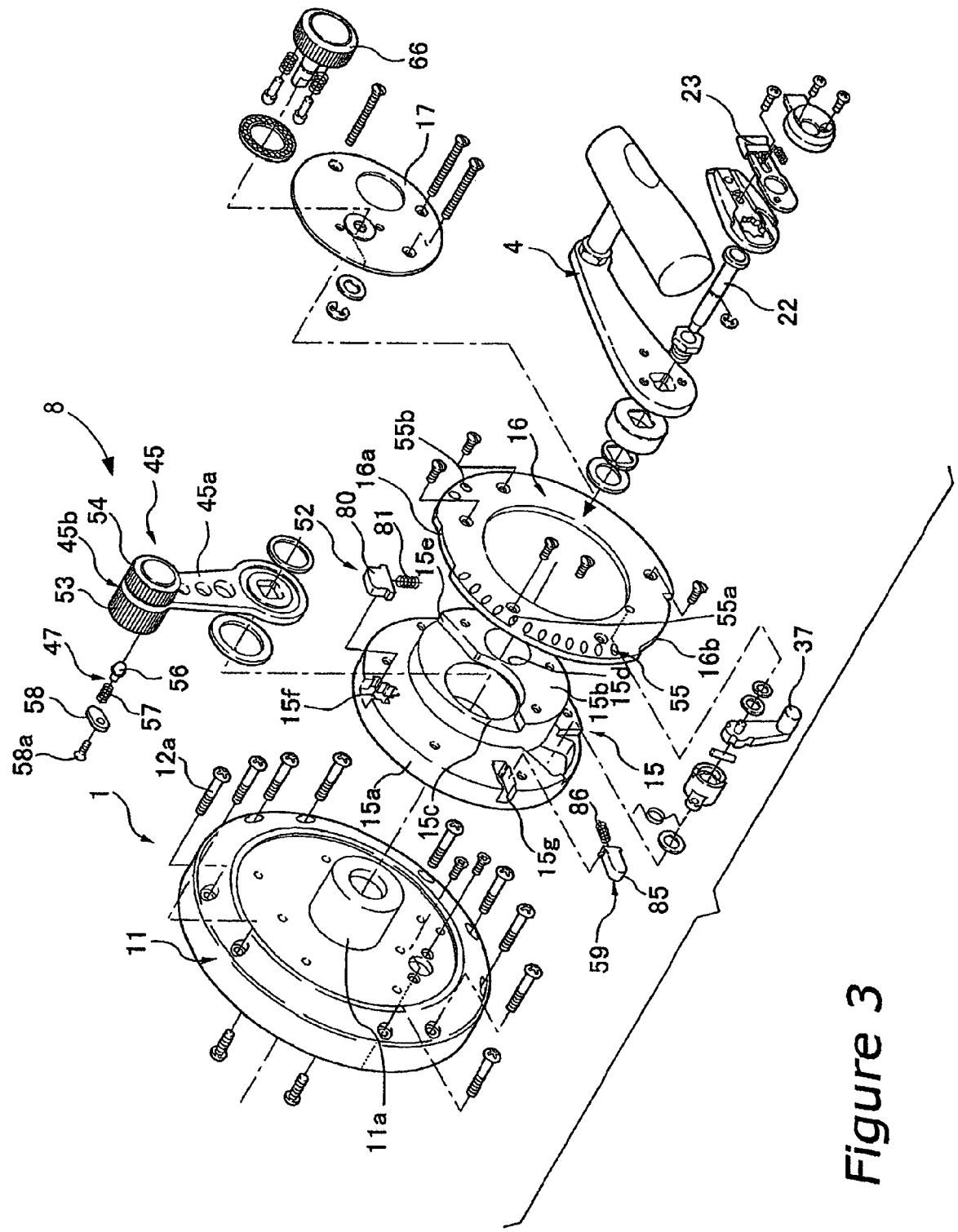
FIG. 3 is an exploded oblique view of a right side of the dual bearing reel illustrated in FIGS. 1 and 2 equipped with the drag adjustment device in accordance with one embodiment of the present invention.

Referring to FIGS. 1-3, the reel unit 1 includes a plurality of fixing screws 1a, first and second side plates 10 and 11 and a reel body 12. The first side plate 10 is made of metal and is disposed at the left side of the reel unit 1. The second side plate 11 is made of metal and is disposed at the right side of the reel unit 1. Specifically, the first side plate 10 is disposed at a left side of the reel body 12 and the second side plate 11 is disposed at a right side of the reel body 12. The reel body 12 is a perforated cylindrical member made of metal. The first and second side plates 10 and 11 are coaxially joined to their respective ends of the reel body 12 by spigot joints and are fastened by the fixing screws 1a. Referring to FIGS. 1 and 2, the reel body 12 includes harness lugs 13 and a rod attachment element 14. The harness lugs 13 are for attachment to a reel harness (not shown). The harness lugs 13 are mounted with a space between them on an upper part of the reel body 12. One of the harness lugs 13 is positioned between the reel body 12 and the first side plate 10. The other harness lug 13 is positioned between the reel body 12 and the second side plate 11. The rod attachment element 14 is for mounting the dual-bearing reel onto a fishing rod (not shown). The rod attachment element 14 is positioned on a bottom portion of the reel body 12.

Each of the first and second side plates 10 and 11 has a central portion that is approximately centered. The central portions of the first and second side plates 10 and 11 rotatably support a respective end of the spool shaft 2. As shown in FIGS. 2 and 3, the second side plate 11 has a side plate boss 11a that protrudes axially outward from the right side of the second side plate 11. The side plate boss 11a is disposed adjacent the handle assembly 4 for supporting the spool shaft 2.

The reel unit 1 further includes a bearing block 15, a lever guide 16 and a decorative metal cover disk 17. The lever guide 16 is secured to the bearing block 15. The bearing block 15 is attached to the second side plate 11.

Referring to FIG. 3, the bearing block 15 is for mounting the handle shaft 5. The bearing block 15 is fastened with screws onto an outer periphery of the side plate boss 11a. The bearing block 15 is made of a synthetic resin, for example, and is a thick-walled, disk-shaped member. The bearing block 15 includes a large diameter portion 15a, a small diameter portion 15b, a first through hole 15c, a second through hole 15d, a lever cut-out portion 15e, a positioning cut-out portion 15f and a resistance-applying cut-out portion 15g. The small diameter portion 15b externally protrudes from the large diameter portion 15a in the axial direction. The first through hole 15c is attached to the side plate boss 11a. The first through hole 15c is formed in the approximate center of the bearing block 15. The second through hole 15d is located radially from the first through hole 15c in the bearing block 15. The lever cut-out portion 15e restricts the pivoting range of the drag adjustment lever 45 of the drag adjustment mechanism 8. The lever cut-out portion 15e is formed in the small diameter portion 15b. The positioning cut-out portion 15f is for positioning the drag adjustment lever 45. The resistance-applying cut-out portion 15g is for applying resistance in the brake release side. The positioning cut-out portion 15f and the resistance-applying cut-out portion 15g are formed from a side surface to an outer periphery surface of the large diameter portion 15a so as to be spaced at an interval in the circumferential direction. The decorative metal cover disk 17 is attached to an end of the bearing block 15.

The bearing block 15 further includes a cylindrical member 18. The cylindrical member 18 is inserted into the bearing block 15 below the side plate boss 11a.

The lever guide 16 is a disc-shaped metal member that guides the drag adjustment lever 45. The lever guide 16 is fastened to the side surface of the large diameter portion 15a of the bearing block 15 with screws. The lever guide 16 includes a first cut-out 16a and a second cut-out 16b. The first cut-out 16a and the second cut-out 16b are recessed internally in the radial direction. The first and second cut-outs 16a and 16b are formed in an arc shape on an outer periphery portion of the lever guide 16. The first cut-out 16a accommodates a positioning mechanism of the drag adjustment lever 45. The second cut-out 16b accommodates an operating lever 37 of a spool sounding mechanism 38.

As shown in FIG. 2, the spool shaft 2 is rotatably supported by a pair of first and second bearings 31a and 31b. The first bearing 31a is disposed in the first side plate 10 and is located at a left end of the spool shaft 2. The second bearing 31b is disposed in the second side plate 11 and is located at a right end of the spool shaft 2. A set of third and fourth bearings 32a and 32b are spaced axially inward from the first and second bearings 31a and 31b. The third bearing 32a is disposed at a left end of the spool 3 and the fourth bearing 32b is disposed at a right end of the spool 3. The third and fourth bearings 32a and 32b rotatably support the spool 3. Components of the lever drag mechanism 7 adjoin a right side of an outer race of the second bearing 31b at the right end of the spool shaft 2. Additionally, a component of the rotation transmission mechanism 6 adjoins a left side of an inner race of the second bearing 31b. The reverse rotation check mechanism 9 adjoins a right side of an inner race of the first bearing 31a on the left end of the spool shaft 2. Furthermore, the first side plate 10 abuts a left end of an outer race of the first bearing 31a. A hydrothermal drag mechanism 33 abuts a left side of an outer race of the fourth bearing 32b. In addition, a plurality of disk springs 34 abuts on a right side of an inner race of the fourth bearing 32b via a washer. The disk springs 34 are provided in order to make the drag force adjustable over a broad range with respect to pivot of the drag adjustment lever 45, without the drag force elevating abruptly. A component of the lever drag mechanism 7 abuts a left side of an inner race of the third bearing 32a. A right side of an outer race of the third bearing 32a abuts the spool 3.

The spool 3 has a bobbin trunk 3a, flanges 3b and an annular groove 3c. The flanges 3b are formed integrally with the bobbin trunk 3a. The flanges 3b are located at opposite ends of the bobbin trunk 3a. A spool sounding mechanism 38 is provided on an end face of the flange 3b on the right side of the bobbin trunk 3a.

Figure 5:
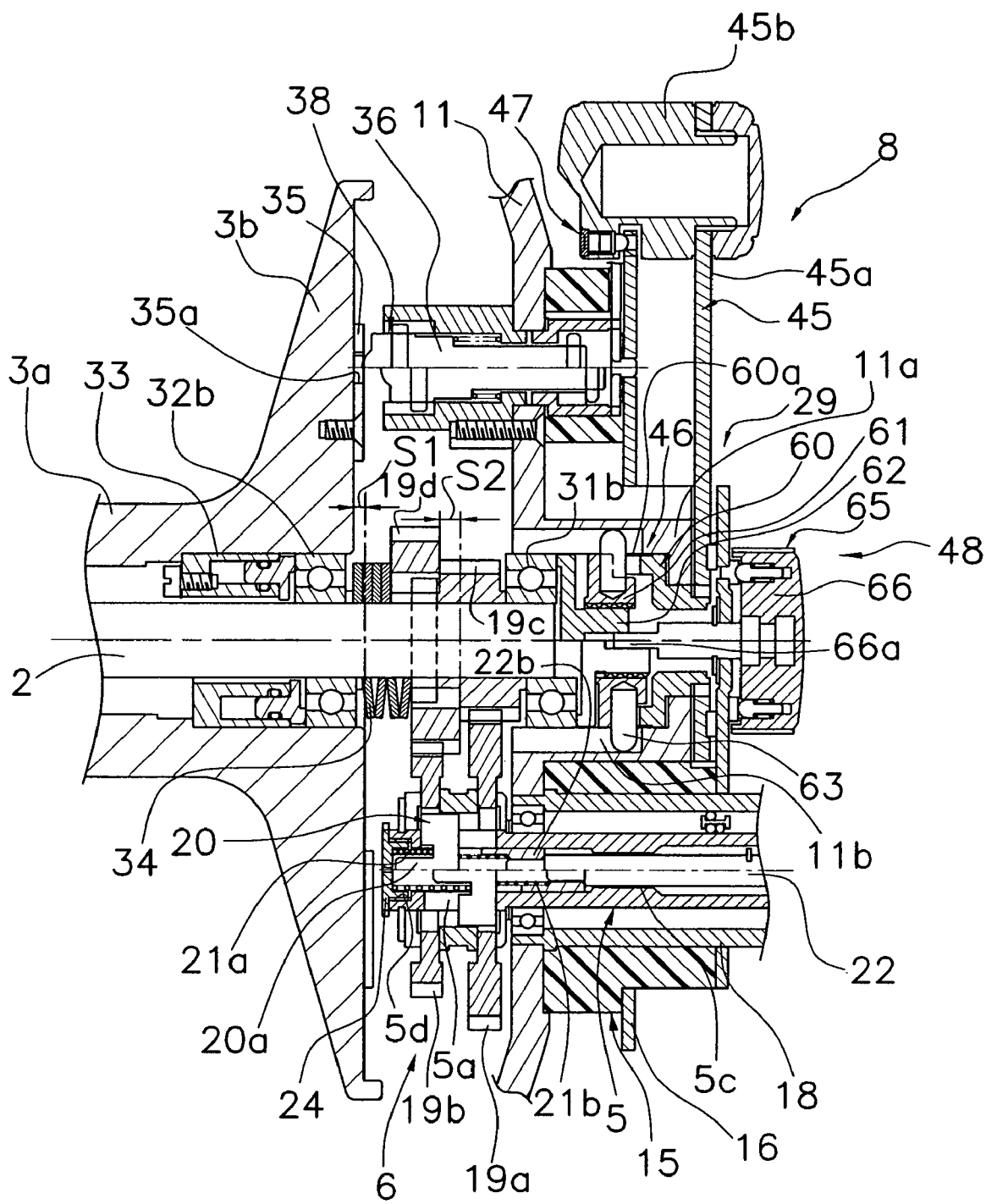
FIG. 5 is an enlarged view of the right side of the cross sectional view of the dual-bearing reel illustrated in FIG. 2 equipped with the drag adjustment device in accordance with one embodiment of the present invention.

As shown in FIG. 5, the spool sounding mechanism 38 has a sound-emitting ring 35 and a spool sound-emitting pin 36. The spool sound-emitting pin 36 collides with the sound-emitting ring 35. The sound-emitting ring 35 is attached to the flange 3b of the spool 3. The sound-emitting ring 35 has a plurality of sound-emitting emitting holes 35a in the circumferential direction. The spool sound-emitting pin 36 is attached to the second side plate 11 so as to oppose the sound-emitting holes 35a. The spool sound-emitting pin 36 is biased to protrude toward the sound-emitting holes 35a. The operating lever 37 of the spool sounding mechanism 38 selectively shifts the spool sound-emitting pin 36 between an advancing position and a retreating position. The operating lever 37 is normally positioned so as to advance the spool sound-emitting pin 36 except when tackle is cast. Accordingly, a click sound is normally emitted when the spool 3 rotates.

As shown in FIGS. 2 and 5, the handle assembly 4 is fixed to a protruding end of the tubular handle shaft 5. The handle shaft 5 is disposed below the spool shaft 2 and is parallel with the spool shaft 2. The handle shaft 5 includes an aperture 5a, a first guiding portion 5b, a second guiding portion 5c and female threads 5d. The aperture 5a is formed in the axial direction at the left end of the handle shaft 5. The female threads 5d are formed on an interior surface of the aperture 5a. The handle shaft 5 is rotatably supported by fifth and sixth bearings 33a and 33b. The fifth and sixth bearings 33a and 33b are disposed under the side plate boss 11a. The fifth and sixth bearings 33a and 33b are spaced apart from each other in the axial direction. The fifth and sixth bearings 33a and 33b are mounted on an inner peripheral surface of the cylindrical member 18. The fifth and sixth bearings 33a and 33b are located at opposite ends of the cylindrical member 18.

Figure 10:
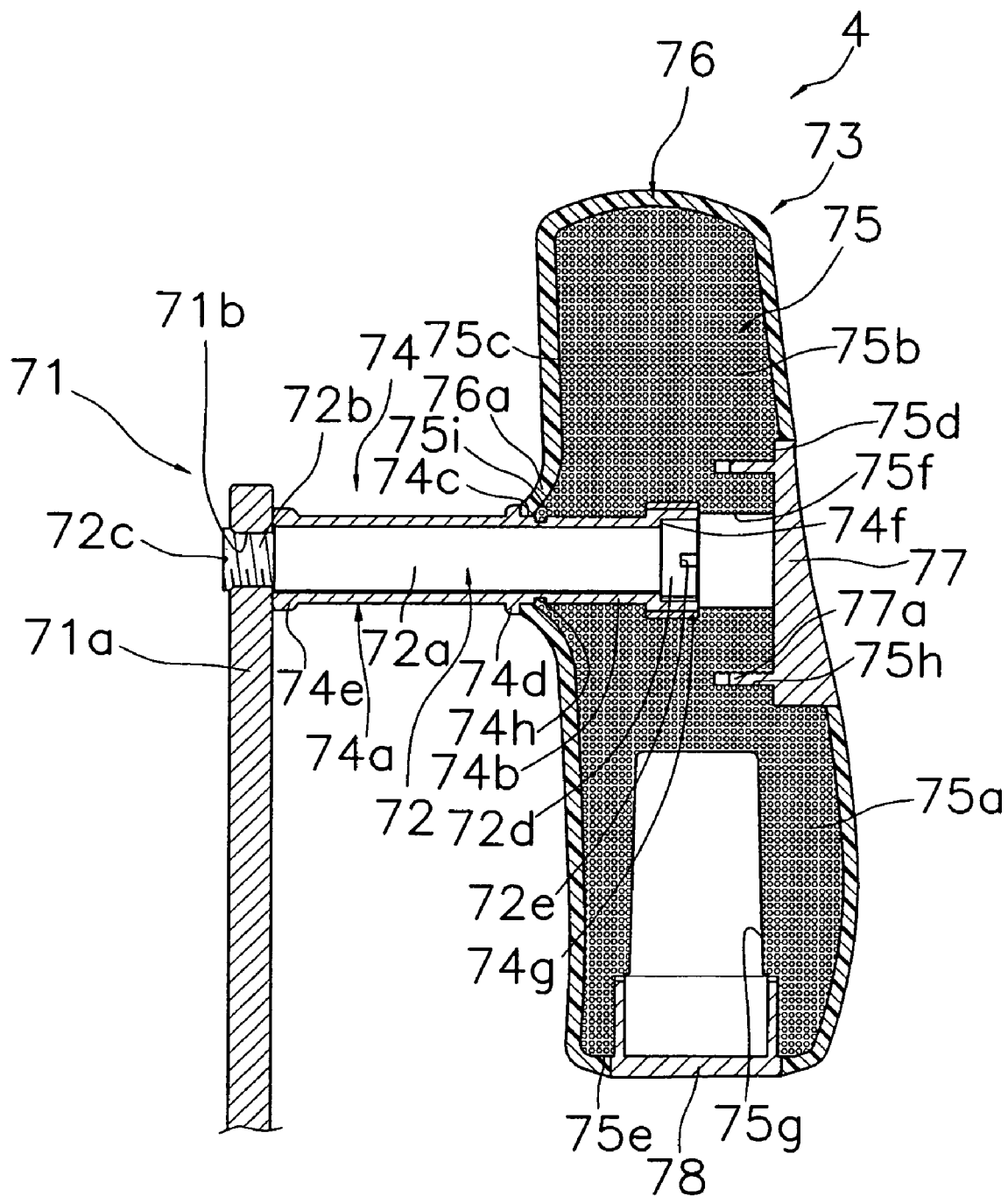
FIG. 10 is an enlarged, cross sectional view of a handle assembly of the dual bearing reel illustrated in FIGS. 1-4 in accordance with one embodiment of the present invention.

As shown in FIG. 10, the handle assembly 4 has a handle arm 71, a grip shaft 72 and a handle grip 73. The handle arm 71 has a base end mounted to the protruding end of the handle shaft 5. The grip shaft 72 is mounted to an end of the handle arm 71 opposite the base end of the handle arm 71. The handle grip 73 is rotatably attached to the grip shaft 72.

The handle arm 71 includes a plate-shaped arm body 71a and an arm body female threaded portion 71b. The arm body female threaded portion 71b is formed parallel to the handle shaft 5 and is located at an end of the arm body 71a. The arm body 71a extends in a direction that intersects the handle shaft 5. The arm body 71a is made of a stainless steel alloy, for example. A countersink is formed in an opening of the arm body female threaded portion 71b.

Figure 12:
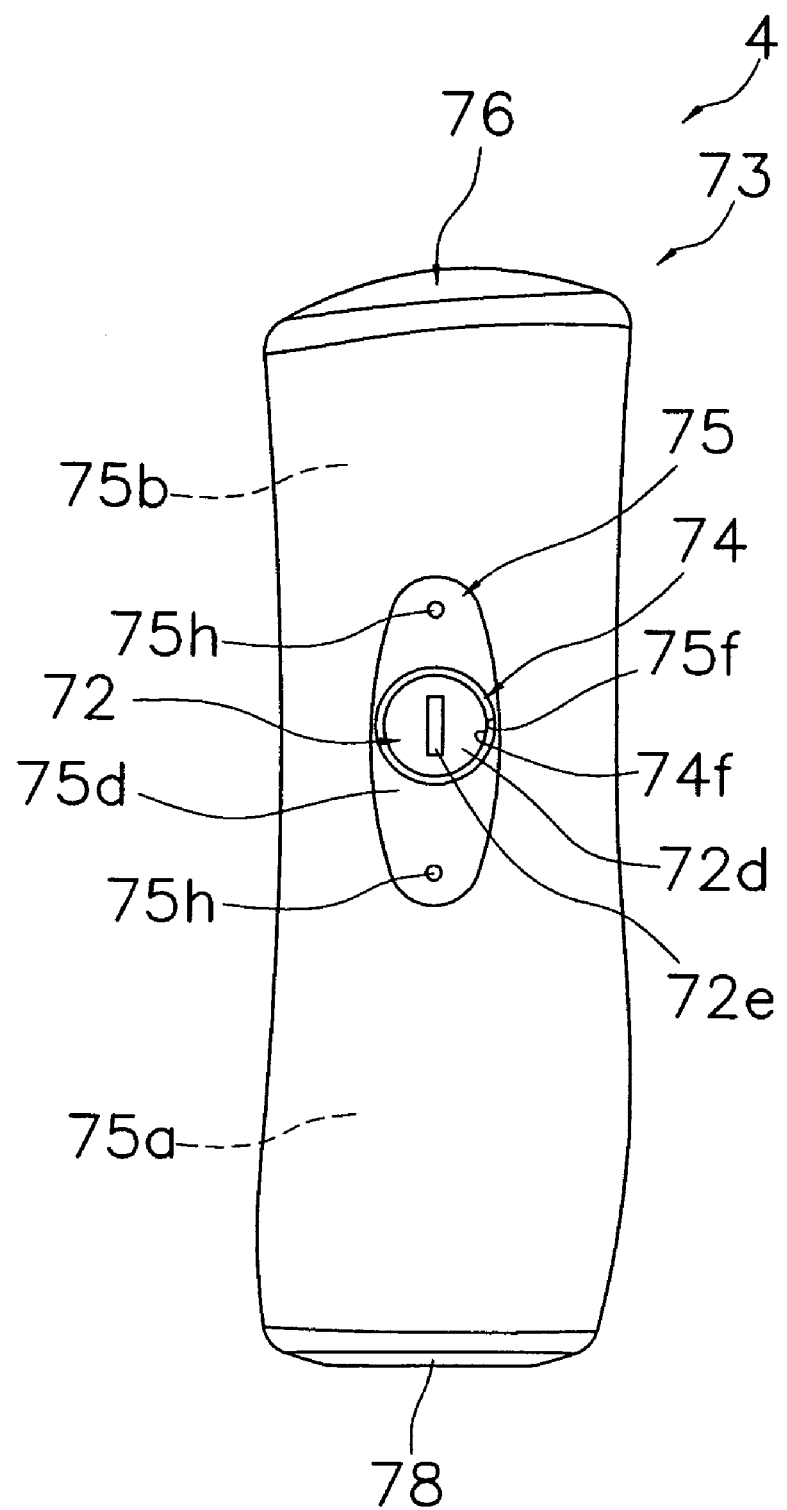
FIG. 12 is an enlarged, right side view of the handle assembly of the dual bearing reel illustrated in FIGS. 1-4, 10 and 11 in accordance with one embodiment of the present invention.

Referring to FIGS. 10 and 12, the grip shaft 72 has a shaft body 72a, a male threaded portion 72b, a caulking hole 72c, a head 72d and an interlock portion 72e. The shaft body 72a is made of a stainless steel alloy, for example. The shaft body 72a extends in a direction parallel to the handle shaft 5 from an end of the handle arm 71. The male threaded portion 72b has a diameter smaller than the shaft body 72a. The male threaded portion 72b is located at a left end of the shaft body 72a. The male threaded portion 72b is threaded into the female threaded portion 71b. The head 72d has a diameter larger than the shaft body 72a. The head 72d is located at a right end of the shaft body 72a. The interlock portion 72e is formed on a right end surface of the head 72d in order to interlock a tool for rotating the grip shaft 72. The grip shaft 72 is caulked on the end of the handle arm 71 after the male threaded portion 72b is threaded into the arm body female threaded portion 71b. Thus, the caulking hole 72c is formed in the male threaded portion 72b by a caulker. In this embodiment, a left end of the male threaded portion 72b is deformed and expands outwardly from the countersink of the arm body female threaded portion 71b. Thus, the grip shaft 72 is caulked on the end of the handle arm 71.

Figure 11:
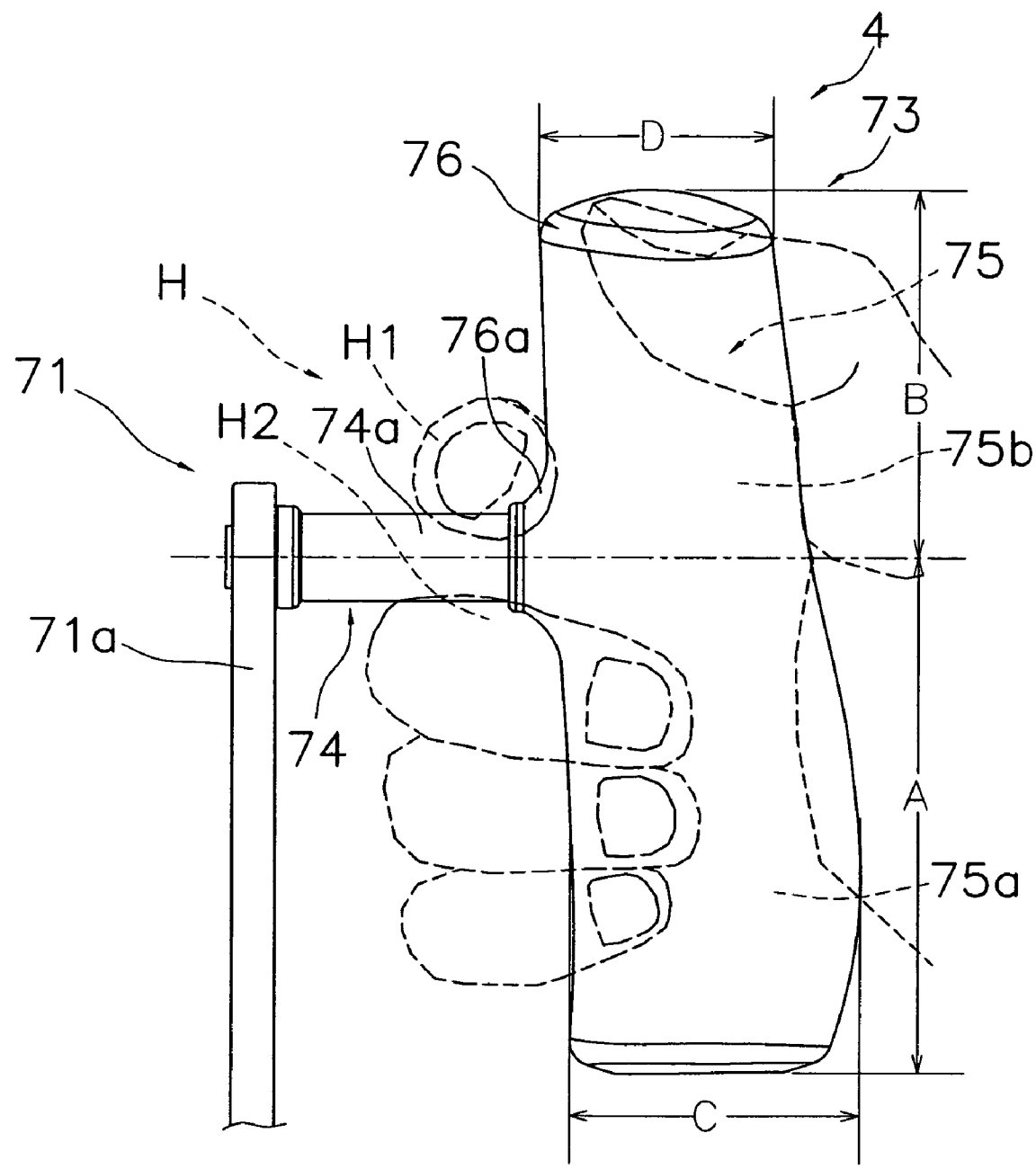
FIG. 11 is an enlarged, side view of the handle assembly of the dual bearing reel illustrated in FIGS. 1-4 and 10 in accordance with one embodiment of the present invention.

As shown in FIGS. 10-12, the handle grip 73 has a handle grip cylindrical member 74, a grip member 75 and a cover member 76. The cover member 76 covers an outer periphery of the grip member 75. The cover member 76 is made of an elastic resin, for example. The handle grip cylindrical member 74 is rotatably attached to an outer periphery of the grip shaft 72. The grip member 75 is non-rotatably mounted to the handle grip cylindrical member 74.

As shown in FIG. 10, the handle grip cylindrical member 74 is made of metal, such as brass or copper-zinc alloy, for example. A chrome plating process is performed on an outer periphery of the handle grip cylindrical member 74. A small gap is provided between an inner periphery of the handle grip cylindrical member 74 and the outer periphery of the grip shaft 72. The handle grip cylindrical member 74 includes an exposed portion 74a and an embedded portion 74b. The embedded portion 74b is located in a left side of the grip member 75. The embedded portion 74b is embedded inside the grip member 75 by insert-molding. The exposed portion 74a protrudes from the left side of the grip member 75.

The exposed portion 74a includes a fore end section 74c, a first circular section 74d and a second circular section 74e. The second circular section 74e has a diameter larger than a diameter of a majority of the exposed portion 74a. The second circular section 74e is located on an outer periphery of the exposed portion 74a at a left end of the exposed portion 74a. The fore end section 74c is located where two fingers are able to sandwich the handle grip cylindrical member 74 when the grip member 75 is gripped. The first circular section 74d has a diameter larger than a diameter of a majority of the exposed portion 74a. The first circular section 74d is located on an outer periphery of the exposed portion 74a adjacent the fore end section 74c. An end surface of the cover member 76 is in contact with an outer periphery surface of the fore end section 74c. The end surface of the cover member 76 also contacts a right surface of the first circular section 74d.

The embedded portion 74b includes a stepped section 74f, a protruding section 74g and a groove 74h. The stepped section 74f is formed on an inner periphery of the handle grip cylindrical member 74 at the right end of the handle grip cylindrical member 74. The protruding section 74g has a large diameter and is formed on the outer periphery of the handle grip cylindrical member 74 at the right end of the handle grip cylindrical member 74. The groove 74h is recessed along the outer circumference of the handle grip cylindrical member 74 adjacent the first circular section 74d. The head 72d of the grip shaft 72 is accommodated in the stepped section 74f. Accordingly, the handle grip cylindrical member 74 is retained to the grip shaft 72. In addition, the protruding section 74g and the groove 74h are formed in order to facilitate retaining the position of the handle grip cylindrical member 74 in the grip member 75 when insert-molded.

As shown in FIGS. 10 and 12, the grip member 75 is a substantially pillar-shaped member. The grip member 75 is made of an expanded resin, for example, for insert-molding the right end of the handle grip cylindrical member 74. The grip member 75 includes first and second grip portions 75a and 75b. The first and second grip portions 75a and 75b extend in a substantially pillar shape from the outer periphery of the handle grip cylindrical member 74. Each of the first and second grip portions 75a and 75b extend in an opposite direction from that of the other. An axis of the first and second grip portions 75a and 75b intersects an axis of the grip shaft 72.

Referring to FIG. 11, in relation to the axis of the handle grip cylindrical member 74, a first radial direction length A of the first grip portion 75a is longer than a second radial direction length B of the second grip portion 75b. A first axial direction length C of the first grip portion 75a is longer than a second axial direction length D of the second grip portion 75b.

As shown in FIG. 10, the grip member 75 further includes a front end surface 75c, a rear end surface 75d, a side end surface 75e, a grip member grip member through hole 75f, a recessed section 75g and a plurality of interlock holes 75h. The grip member through hole 75f is formed in a substantially central portion of the grip member 75 along the axis of the handle grip cylindrical member 74. The grip member through hole 75f penetrates between the front end surface 75c and the rear end surface 75d. The recessed section 75g is recessed in the side end surface 75e. The handle grip cylindrical member 74 is located in the front end surface 75c side of the grip member through hole 75f. The interlock holes 75h are recessed at two locations in the rear end surface 75d of the grip member 75.

A first lid member 77 closes an opening of the grip member through hole 75f in the rear end surface 75d. The first lid member 77 includes interlock protrusions 77a, which are formed at two locations on a left side of the first lid member 77 so as to be spaced at an interval from each other. The two interlock protrusions 77a engage with the interlock holes 75h to mount the first lid member 77 to the grip member 75. The recessed section 75g is cut in a substantially cylindrical shape along the longitudinal direction of the first grip portion 75a for weight reduction. The opening of the recessed section 75g in the side end surface 75e is closed by a second lid member 78.

As shown in FIG. 10, the outer periphery surface of the grip member 75 is formed continuously with the smooth, concave inner peripheral surface of the cover member 76. The grip member 75 further includes a connecting section 75i, which connects the outer periphery surface of the fore end section 74c to the front end surface 75c of the grip member 75.

The cover member 76 is made of an elastic resin, such as a styrene group thermoplastic elastomer, for example. Preferably, the cover member 76 is made of a thermoplastic elastomer, such as SEPTON, for example. The cover member 76 is formed during the insert molding of the handle grip cylindrical member 74 into the grip member 75. The cover member 76 covers the outer periphery of the fore end section 74c of the handle grip cylindrical member 74 and the grip member 75. The cover member 76 covers the outer periphery of the connecting section 75i of the grip member 75 with a curved surface portion 76a, which has a smooth concave surface. An end of the cover member 76 is smoothly connected to the first circular section 74d of the handle grip cylindrical member 74. In addition, the cover member 76 is not formed over the openings of the grip member through hole 75f and the recessed portion 75g. Rather, the openings of the grip member through hole 75f and the recessed portion 75g are closed by the first and second lid members 77 and 78.

Referring to FIG. 11, when an angler grips the handle grip 73 with his hand H, he sandwiches the handle grip cylindrical member 74 with his index finger H1 and middle finger H2. In this case, the sides of the index finger H1 and the middle finger H2 come in contact with the exposed portion 74a of the handle grip cylindrical member 74. Ventral surfaces of the index finger H1 and the middle finger H2 come in contact with the curved surface portion 76a of the cover member 76. In this construction, a majority of the exposed portion 74a of the handle grip cylindrical member 74 is not covered with the cover member 76. Accordingly, the outer diameter of the handle grip cylindrical member 74 is not increased. Thus, sandwiching the handle grip cylindrical member 74 between the index finger H1 and the middle finger H2 is facilitated. Accordingly, gripping characteristics of the handle grip 73 are improved.

Referring to FIGS. 2 and 5, the rotation transmission mechanism 6 has a change-speed mechanism that selects between two speeds (high and low). The rotation transmission mechanism 6 includes first, second, third and fourth gears 19a, 19b, 19c and 19d, an engaging member 20, first and second compression springs 21a and 21b and an operation shaft 22. The first gear 19a is for high-speed winding. The second gear 19b is for low-speed winding. The first and second gears 19a and 19b are rotatably supported by the handle shaft 5 of the handle assembly 4. The third and fourth gears 19c and 19d are non-rotatably attached to the spool shaft 2. The third and fourth gears 19c and 19d mesh with the first and second gears 19a and 19b, respectively. The engaging member 20 is coupled with one of the first and second gears 19a and 19b to transmit rotation. The first and second compression springs 21a and 21b are located on opposite sides of the engaging member 20. The operation shaft 22, in conjunction with the bias of the first and second compression springs 21a and 21b, sets the position of the engaging member 20.

The engaging member 20 is non-rotatably disposed in the aperture 5a of the handle shaft 5. The engaging member 20 includes a protrusion portion 20a. The protrusion portion 20a is provided in a central section of the engaging member 20. A spring holder 24, having a flange, receives the first compression spring 21a. The protrusion portion 20a is provided in an inner peripheral side of the flange-shaped spring holder 24. The spring holder 24 is fastened to the left end of the handle shaft 5 via threads.

Referring to FIGS. 2 and 5, the operation shaft 22 penetrates the handle shaft 5 in the interior of the handle shaft 5 and protrudes outwardly. The operation shaft 22 is movably supported in the axial direction by the first guiding portion 5b and the second guiding portion 5c. The first guiding portion 5b is screwed at a protruding end of the handle shaft 5. The second guiding portion 5c is formed on a central section of the inner peripheral surface of the handle shaft 5. The operation shaft 22 includes a groove 22a and a spring holder member 22b. The groove 22a is formed at the outward protruding end of the operation shaft 22. A slide-type stopper 23 engages with the groove 22a and is provided on the handle assembly 4. The spring holder member 22b receives the second compression spring 21b. The spring holder member 22b is attached to the left end of the operation shaft 22.

Referring to FIG. 5, relative to the axis of the operation shaft 22, the selection of the first or second gear 19a or 19b is illustrated. Specifically, an upper section of the handle shaft 5, rotation transmission mechanism 6 and operation shaft 22 that is illustrated above the axis of the operation shaft 22 shows the operation shaft 22 when pressed inwardly. When the operation shaft 22 is pressed inwardly, the engaging member 20 is positioned at the second gear 19b. The rotation of the handle assembly 4 is then transmitted to the fourth gear 19d via the second gear 19b. Accordingly, the spool shaft 2 and the spool 3 rotate at low speed. On the other hand, a lower section of the handle shaft 5, rotation transmission mechanism 6 and operation shaft 22 that is illustrated below the axis of the operation shaft 22 shows the operation shaft 22 when pulled outwardly by sliding the slide-type stopper 23. When the operation shaft 22 is pulled outwardly, the engaging member 20 is positioned at the first gear 19a. The rotation of the handle assembly 4 is then transmitted to the third gear 19c via the first gear 19a. Accordingly, the spool shaft 2 and the spool 3 rotate at high speed.

Figure 6:
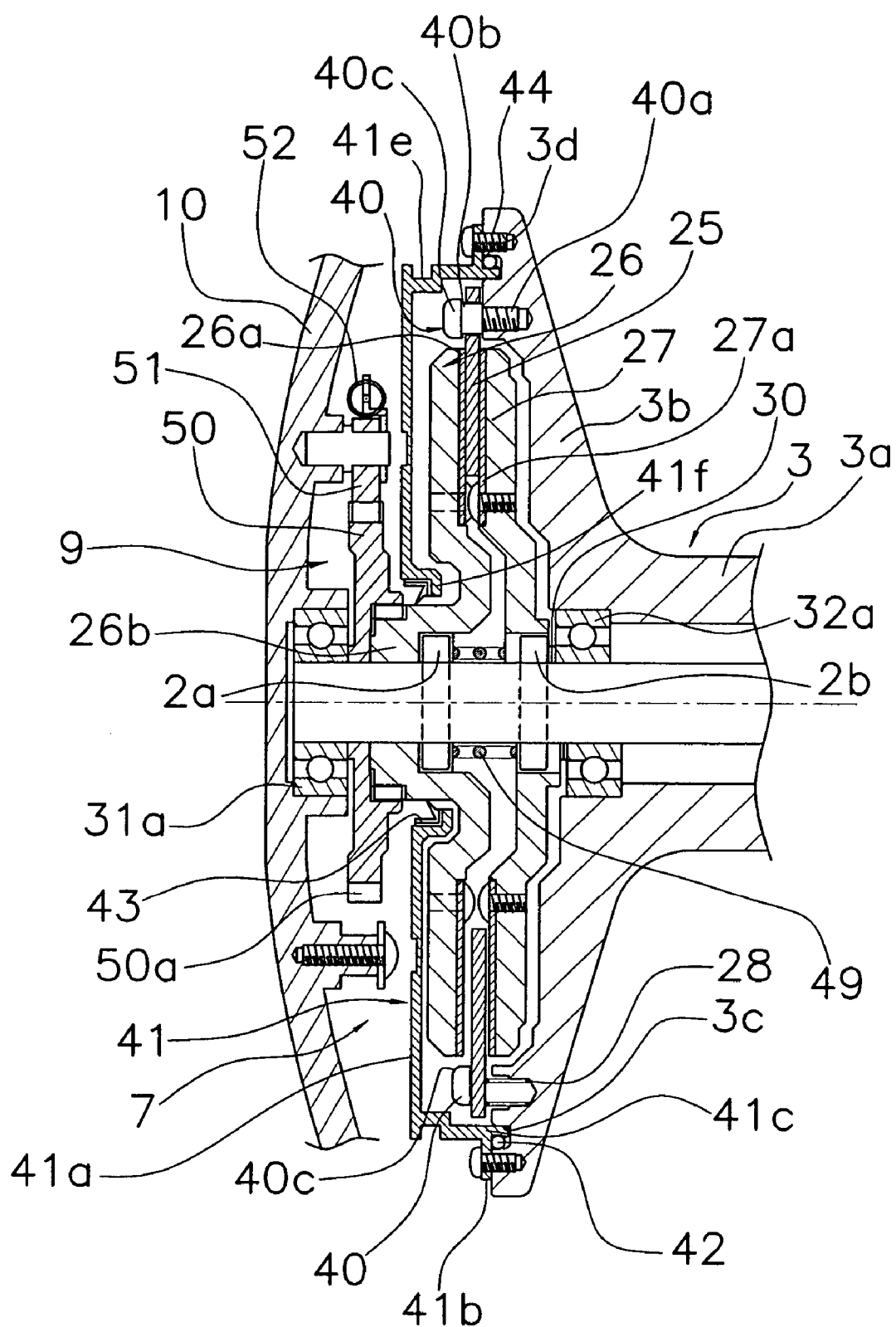
FIG. 6 is an enlarged view of the left side of the cross sectional view of the dual-bearing reel illustrated in FIG. 2 equipped with the drag adjustment device in accordance with one embodiment of the present invention.
Figure 7:
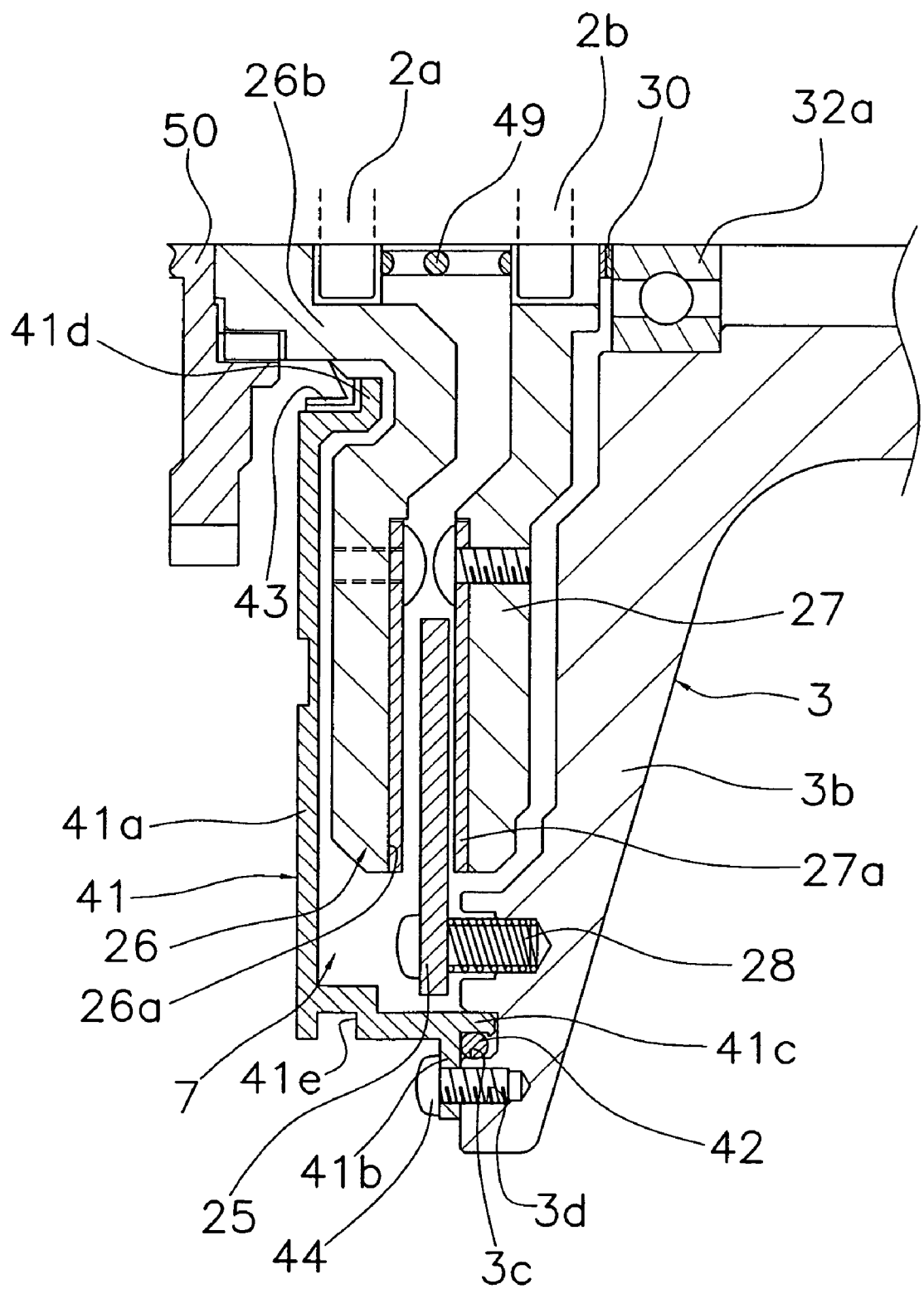
FIG. 7 is an enlarged view of the cross sectional view of a lever drag mechanism of the drag adjustment device illustrated in FIG. 2 in accordance with one embodiment of the present invention.

As shown in FIGS. 2, 6 and 7, the lever drag mechanism 7 has a brake disk 25, first and second friction disks 26 and 27 and drag mechanism coil springs 28. The brake disk 25 is attached to the left end of the spool 3. The first and second friction disks 26 and 27 are arranged at left and right sides, respectively, of the brake disk 25. The drag mechanism coil spring 28 urges the brake disk 25 away from the second friction disk 27.

As shown in FIGS. 6 and 7, the brake disk 25 is a washer-shaped disk member made of a stainless steel alloy, for example. The brake disk 25 is mounted to the spool 3 and is movable in the axial direction of the spool 3. The brake disk 25 is non-rotatably mounted with respect to the spool 3. The brake disk 25 is coupled to an end face of the left-side flange 3b with a plurality of attaching pins 40.

The attaching pins 40 are spaced at circumferential intervals. The attaching pins 40 have a threaded portion 40a, a guiding portion 40b and a head portion 40c. The threaded portion 40a is threaded on the end face of the flange 3b. The guiding portion 40b has a diameter larger than the threaded portion 40a. The head portion 40c has a diameter larger than the guiding portion 40b. The brake disk 25 is movably attached to the guiding portion 40b. The brake disk 25 is able to move a predetermined distance in the axial direction. The predetermined distance is obtained by subtracting the thickness of the brake disk 25 from the axial length of the guiding portion 40b. The attaching pins 40 serve as both a rotation-stopping member and a restriction member for the brake disk 25. In the brake-release state, the brake disk 25 is urged by the drag mechanism coil springs 28 to contact the head portion 40c.

Referring to FIG. 6, relative to the axis of the spool shaft 2, the braking state and the brake-release state are illustrated. Specifically, an upper section that is illustrated above the axis of the spool shaft 2 shows the braking state. A lower section that is illustrated below the axis of the spool shaft 2 shows the brake-release state. The first friction disk 26 opposes the left face of the brake disk 25. The first friction disk 26 includes a ring-shaped friction plate 26a and a friction disk boss 26b. The friction plate 26a is made of abrasion-resistant material, e.g., carbon graphite or fiber-reinforced resin. The friction plate 26a is coupled to the surface of the first friction disk 26 that opposes the brake disk 25 by any suitable fastening means, such as screws. In the central portion of the first friction disk 26 is the cylindrical friction disk boss 26b and a first pin 2a. The first pin 2a is fitted into the spool shaft 2. The first pin 2a passes through the spool shaft 2 diametrically and interlocks with the friction disk boss 26b. Accordingly, the first friction disk 26 is mounted on the spool shaft 2 and rotates together with the spool shaft 2.

The second friction disk 27 opposes the right side of the brake disk 25. The second friction disk 27 is attached to the spool shaft 2. The second friction disk 27 is movable in the axial direction of the spool 3 so as to rotate in association with the first friction disk 26 and to selectively contact the first friction disk 26. The second friction disk 27 includes a ring-shaped second friction plate 27a. The second friction plate is made of an abrasion-resistant material, e.g., carbon graphite or fiber-reinforced resin. The second friction plate 27a is fastened to the surface of the second friction disk 27 that opposes the brake disk 25 by screws or the like. The second friction disk 27 is non-rotatably attached to the spool shaft 2 at the center by a second pin 2b. The second pin 2b is fitted into the spool shaft 2. The second pin 2b passes through the spool shaft 2 diametrically and interlocks with the second friction disk 27. Furthermore, an inner race of the third bearing 32a adjoins a right-end surface of the second friction disk 27 via a washer 30. As a result, the second friction disk 27 urges the spool 3.

A drag cover 41 covers a left exterior of the first friction disk 26. The drag cover 41 is made of an aluminum alloy, for example, to aid in heat dissipation. The drag cover 41 has a plate-shaped cover body 41a, a ring-shaped attachment portion 41b, a cylindrical first seal portion 41c and a second seal portion 41d. The cover body 41a has a circular opening at a center. The attachment portion 41b is unitarily formed with the cover body 41a on an outer periphery surface of the cover body 41a. The cover body 41a has an interior space that accommodates the first and second friction disks 26 and 27 and the brake disk 25. The attachment portion 41b is secured to an end surface of the flange 3b of the spool 3 with a plurality of screws or the like to facilitate assembly.

The first seal portion 41c protrudes from a right side end surface of the attachment portion 41b towards the spool 3.

The annular groove 3c is formed on a left end surface of the flange 3b. The first seal portion 41c is inserted into the annular groove 3c. An inner peripheral surface of the first seal portion 41c centers the spool 3 and the drag cover 41. An O-ring 42 is attached to an outer periphery surface of the first seal portion 41c to prevent infiltration of liquid.

The second seal portion 41d protrudes toward the friction disk boss 26b from an inner peripheral surface of the cover body 41a. A seal member 43 with a lip is attached to the second seal portion 41d. An inner edge of the lip of the seal member 43 is in contact with an outer periphery surface of the friction disk boss 26b of the first friction disk 26. Accordingly, the seal member 43 prevents the infiltration of liquid into an inner circumference side. The O-ring 42 and seal member 43 provide a watertight seal in order to seal the inside of the drag cover 41, in which the brake disk 25, and the first and second friction disks 26 and 27 are provided. Combining the O-ring 42 and the seal member 43 achieves a reliable drag waterproof structure. In order to provide easy attachment of the O-ring 42, an attachment groove for the O-ring 42 may be provided in the first seal portion 41c.

Referring to FIGS. 2, 6 and 7, the reverse rotation check mechanism 9 includes a ratchet wheel 50. The ratchet wheel 50 is in contact with a left end surface of the friction disk boss 26b. The ratchet wheel 50 is non-rotatably attached to an outer periphery of the friction disk boss 26b by a suitable interlocking mechanism, such as serration. The ratchet wheel 50 adjoins an inner race of the first bearing 31a. As a result, the first friction disk 26 cannot shift in the axially outward direction of the spool shaft 2. The ratchet wheel 50 prohibits the first friction disk 26 from rotating in the line-releasing direction.

The reverse rotation check mechanism 9 is a ratchet-type mechanism. The ratchet wheel 50 includes saw teeth 50a that are disposed on an outer periphery of the ratchet wheel 50. The reverse rotation check mechanism 9 further includes a ratchet pawl 51 that interlocks with the tip of the saw teeth 50a. The ratchet pawl 51 is pivotably attached in the internal surface of the first side plate 10. The ratchet pawl 51 is urged towards a side that interlocks the saw teeth 50a by an extended spring.

As shown in FIGS. 3-5, 8 and 9, the drag adjustment mechanism 8 has the drag adjustment lever 45, a moving mechanism 46, a drag adjustment sounding mechanism 47, an intermediate positioning mechanism 52 and a free position restraining mechanism 59. The drag adjustment lever 45 pivots about the spool shaft 2. The moving mechanism 46 moves the spool 3 in the axial direction relative to the spool shaft 2 in response to the pivoting of the drag adjustment lever 45. The drag adjustment sounding mechanism 47 emits sound in response to the pivoting of the drag adjustment lever 45. The intermediate positioning mechanism 52 positions the drag adjustment lever 45 at a strike or intermediate position (illustrated by dashed lines in FIG. 4) between a free position and a maximum position. The free position restraining mechanism 59 restrains the pivoting of the drag adjustment lever 45 at the free position.

The drag adjustment lever 45 pivots between the free position (indicated by solid lines in FIG. 4) and the maximum position. The free position corresponds to the drag free state where the spool 3 can freely rotate. The maximum position corresponds to the maximum drag state of the lever drag mechanism 7. The pivoting range of the drag adjustment lever 45 is restricted so that the drag adjustment lever 45 pivots between the free position and the maximum position by the lever cut-out portion 15e formed in the bearing block 15.

Figure 8:
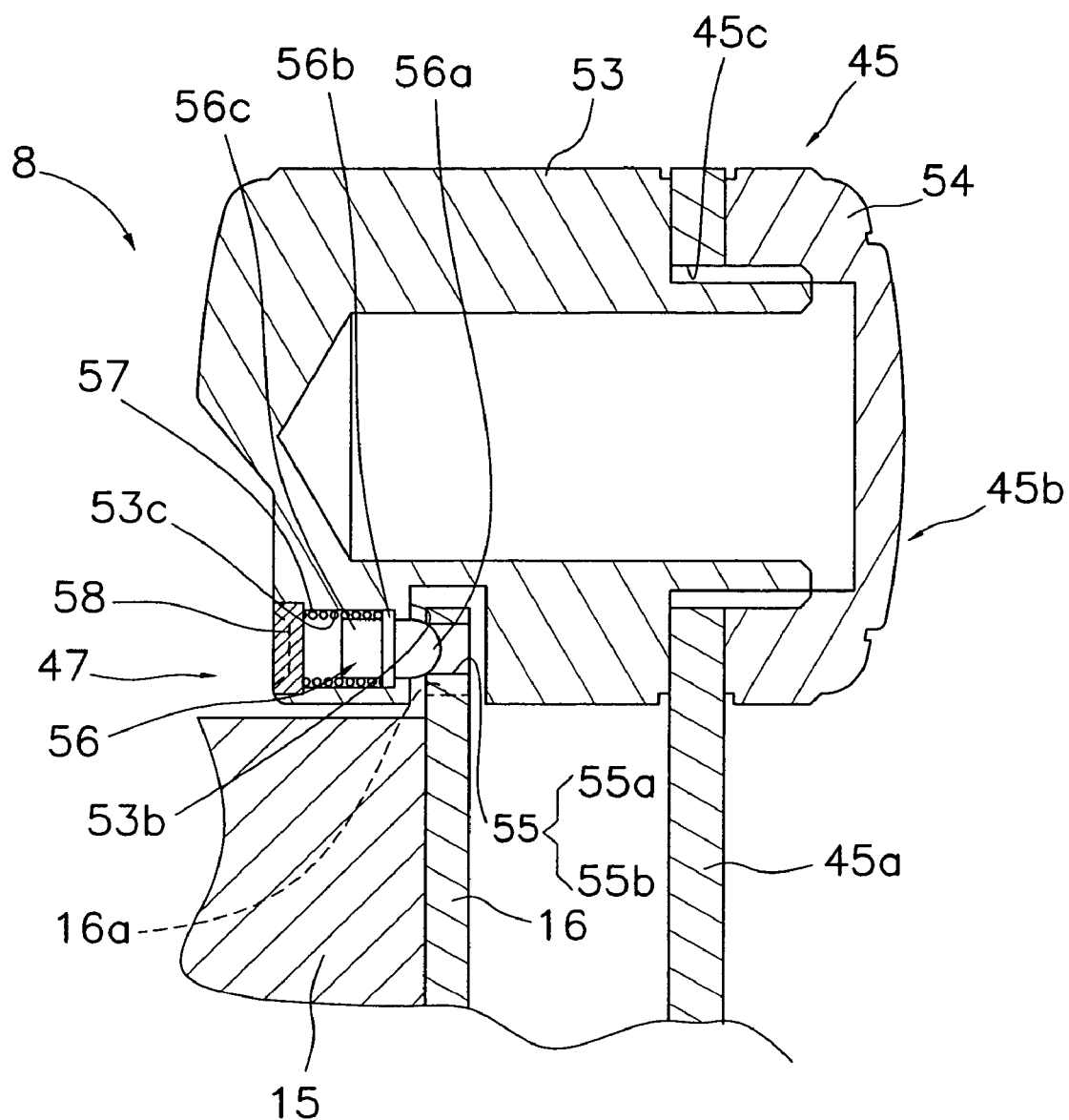
FIG. 8 is an enlarged view of the cross sectional view of a drag adjustment mechanism of the drag adjustment device illustrated in FIGS. 2 and 5 in accordance with one embodiment of the present invention.
Figure 9:
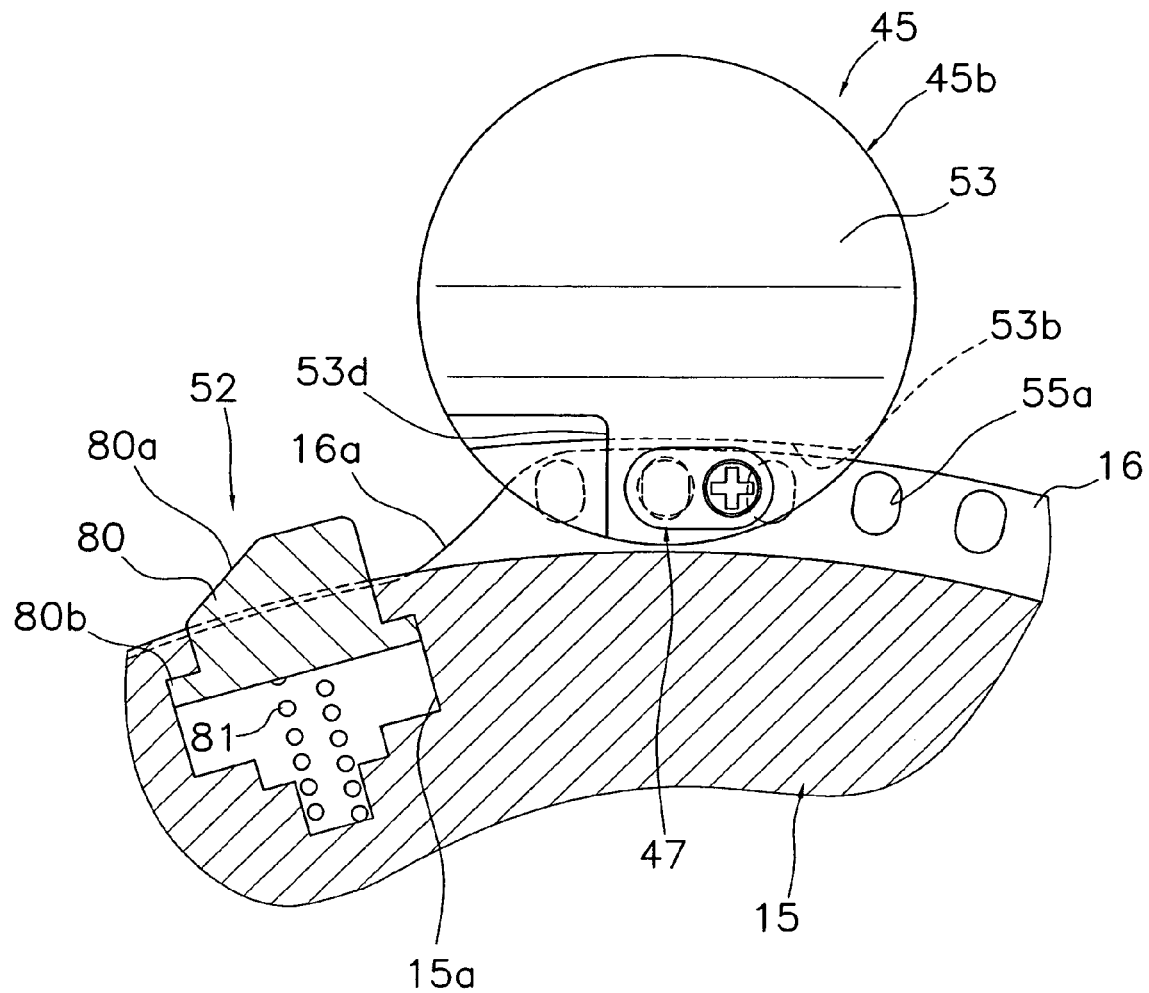
FIG. 9 is an enlarged partial cross sectional view of an inner side a drag adjustment lever, a bearing block and a lever guide of the drag adjustment device illustrated in FIGS. 2, 5 and 8 in accordance with one embodiment of the present invention.

The drag adjustment lever 45 includes a lever portion 45a, a knob 45b and a knob mounting hole 45c. The lever portion 45a is pivotally mounted to the side plate boss 11a and extends externally of the spool shaft 2 in the radial direction. The knob 45b is fastened to the fore end of the lever portion 45a. The base end of the lever portion 45a interlocks non-rotatably with the moving mechanism 46. The knob mounting hole 45c is formed at an end of the lever portion 45a that is opposite to the spool shaft 2. As shown in FIGS. 8 and 9, the knob 45b has a knob unit 53 and a cap nut 54. The cap nut 54 secures the knob unit 53 to the lever portion 45a.

The knob unit 53 includes a male threaded portion 53a that is formed at a right end of the knob unit 53. The male threaded portion 53a goes through the knob mounting hole 45c and threads into the cap nut 54. The knob unit 53 further includes an arc-shaped slit 53b and a stepped mounting hole 53c. The arc-shaped slit 53b is formed in the lower surface of the knob unit 53. The lever guide 16 is inserted into the arc-shaped slit 53b. The stepped mounting hole 53c has a small diameter at an end thereof to mount the drag adjustment sounding mechanism 47. The small diameter of the stepped mounting hole 53c is adjacent the slit 53b. A positioning recessed portion 53d which engages with the intermediate positioning mechanism 52 is formed on the front lower surface of the knob unit 53 so that a wall surface extends in the radial direction.

The moving mechanism 46 includes a pressing mechanism 48 and a return spring 49. The pressing mechanism 48 presses the spool 3 and the second friction disk 27 to shift them leftward in response to the pivoting of the drag adjustment lever 45 clockwise as viewed in FIG. 4. The return spring 49 is fitted circumferentially about the spool shaft 2 in a compressed state. The return spring 49 is located between the first and second friction disks 26 and 27. The return spring 49 urges the first and second friction disks 26 and 27 to separate and urges the second friction disk 27 and the spool 3 rightward. The return spring 49 causes the second friction disk 27 and the spool 3 to shift rightward in response to the moving of the drag adjustment lever 45 counterclockwise as viewed in FIG. 4.

Referring to FIG. 5, the pressing mechanism 48 has a first cam member 60, a second cam member 61, a pressing member 62 and a pressure adjustment mechanism 65. The first cam member 60 is rotatably attached to an inner peripheral surface of the side plate boss 11a but is not movable in the axial direction. The second cam member 61 moves in the axial direction by the pivoting of the first cam member 60. The pressing member 62 moves in the axial direction in cooperation with the second cam member 61. The pressure adjustment mechanism 65 adjusts the pressure by the pressing member 62.

The first cam member 60 is a cylindrical member with large and small levels. The large and small levels pivot in cooperation with the pivoting of the drag adjustment lever 45. The base end of the lever portion 45a of the drag adjustment lever 45 is non-rotatably interlocked with an outer periphery surface of the small diameter level of the first cam member 60 in a right end side by suitable interlocking means, such as serration. The first cam member includes a first slant cam 60a. The first slant cam 60a is formed on an end surface of the large diameter level in a left end side.

The second cam member 61 is a cylindrical member that is non-rotatably attached to an inner peripheral surface of the side plate boss 11a. The second cam member 61 is movable in the axial direction of the side plate boss 11a. The second cam member 61 includes a second slant cam 61a. The second slant cam 61a engages with the first slant cam 60a. The second slant cam 61a is formed on an end surface of the second cam member 61 in the outer periphery side opposing the first cam member 60. Pivotal movement of the first cam member 60 is converted into rectilinear movement of the second cam member 61 in the axial direction by the relative pivoting of the first and second slant cams 60a and 61a. Thus, the second cam member 61 moves in the axial direction. Two interlocking pins 63 protruding in the axial direction are provided in the second cam member 61. The fore ends of the interlocking pins 63 are interlocked with interlock grooves 11b. Thus, the interlocking pins 63 non-rotatably interlock the second cam member 61 with the side plate boss 11a. The inner peripheral surface of the second cam member 61 is threaded into the pressing member 62. Accordingly, it is possible to adjust relative positional relationship in the axial direction between the second cam member 61 and the pressing member 62. It is further possible to adjust the drag force in a predetermined position of the drag adjustment lever 45.

The pressing member 62 is a cylindrical member having a brim. The pressing member 62 has an outer periphery surface that is threaded into the second cam member 61. A left end surface of the brim of the pressing member 62 has a protruding part. The protruding part of the brim adjoins an outer race of the second bearing 31b.

The pressure adjustment mechanism 65 has an adjusting knob 66. The adjusting knob 66 has an end portion 66a that is non-rotatably interlocked with a center of the pressing member 62 but is movable in the axial direction. The adjusting knob 66 is rotatably attached to the reel unit 1 around a center axis of the spool shaft 2. The adjusting knob 66 is configured and arranged to emit a clicking sound from rotation of the adjusting knob 66. When the adjusting knob 66 is rotated, the pressing member 62 pivots. Thus, the relative arrangement in the axial direction between the pressing member 62 and the second cam member changes. Accordingly, it is possible to adjust the drag force where the drag adjustment lever 45 is in a predetermined position.

Referring to FIG. 5, relative to a lower part from the center axis of the spool shaft 2, the state where the pressing member 62 contacts the second cam member 61 to adjust the pressure to a minimum is shown. FIG. 5 also shows, relative to an upper part from the center axis of the spool shaft 2, the state where the pressing member 62 is spaced away from the second cam member 61 at a maximum distance to adjust the pressure to a maximum.

Referring to FIGS. 3, 5, 8 and 9, the drag adjustment sounding mechanism 47 includes a plurality of sound-emitting recessed portions 55, a sound-emitting pin 56 and a sounding mechanism coil spring 57. The sound-emitting recessed portions 55 are provided in the lever guide 16 from the free position to the maximum position and are spaced from each other at intervals in the pivoting direction of the drag adjustment lever 45. The sound-emitting pin 56 is attached to the drag adjustment lever 45 so as to be able to oppose the sound-emitting recessed portions 55. The sound-emitting pin 56 advances into and retreats from the sound-emitting recessed portions 55 as the drag adjustment lever 45 is pivoted. The sounding mechanism coil spring 57 urges the sound-emitting pin 56 toward the sound-emitting recessed portions 55.

Referring to FIGS. 3, 8 and 9, the sound-emitting recessed portions 55 include a plurality of first sound-emitting recessed portions 55a and a plurality of second sound-emitting recessed portions 55b. The first sound emitting recessed portions 55a are formed from the free position to the strike position. The second sound-emitting recessed portions 55b are formed at the maximum position and a position slightly back from the maximum position so as to be spaced at an interval from each other in a pivoting direction. The sound-emitting recessed portions 55 are not present where the intermediate positioning mechanism 52 is operated. Specifically, a region where the first cut-out portion 16a of the lever guide 16 is formed does not have sound-emitting recessed portions 55. The bearing block 15 and the lever guide 16 in the illustrated embodiment constitute a reel unit part that forms part of the drag adjustment sounding mechanism 47.

Figure 4:
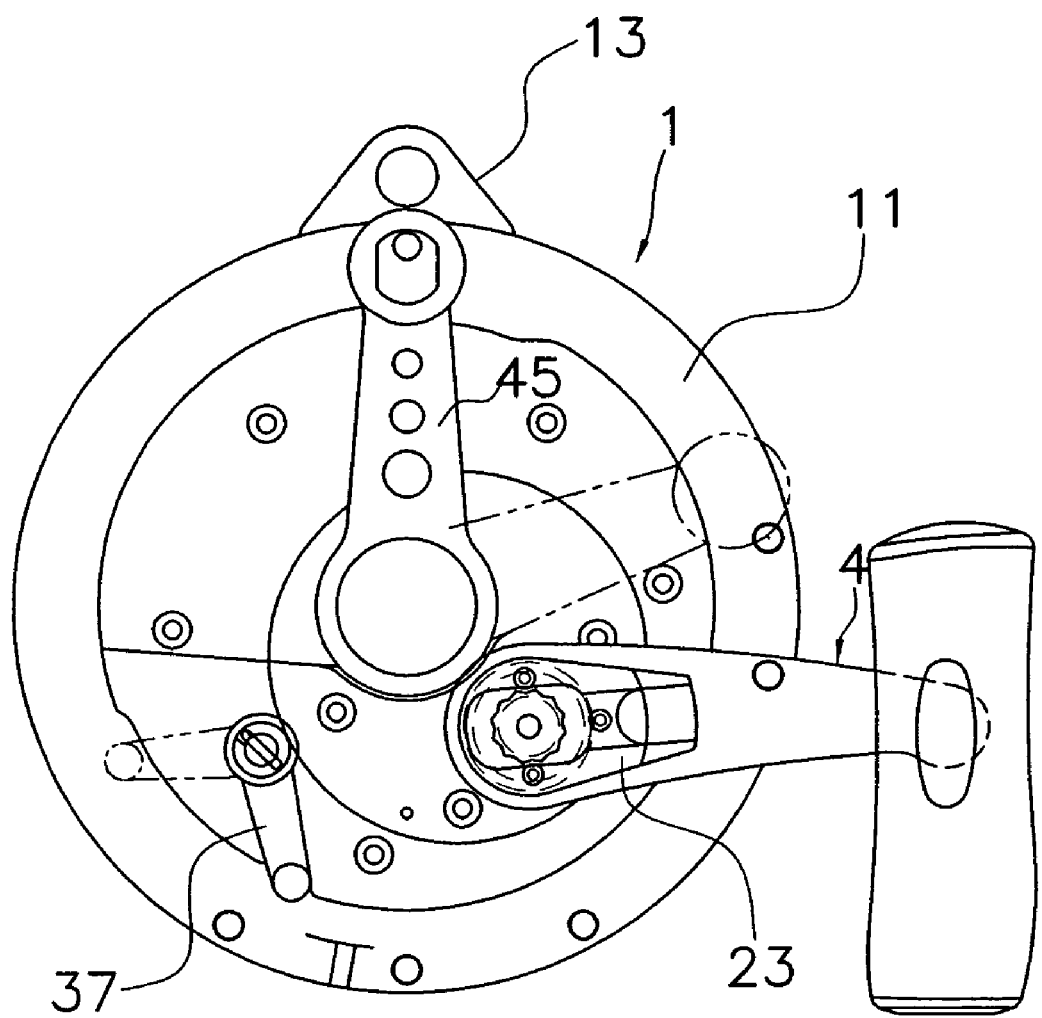
FIG. 4 is a right side view of the dual-bearing reel illustrated in FIGS. 1-3 equipped with the drag adjustment device in accordance with one embodiment of the present invention.

As shown in FIGS. 3, 4, and 9, the first sound-emitting recessed portions 55a are ellipse-shaped holes arranged on an outer periphery portion of the lever guide 16. The second sound-emitting recessed portions 55b are, for example, two ellipse-shaped holes.

The sound-emitting pin 56 is attached to the mounting hole 53c of the knob unit 53 so as to be able to advance into or retreat from the first and second sound-emitting recessed portions 55a and 55b. The sound-emitting pin 56 includes a semi-spherical head 56a, a brim portion 56b and a shaft portion 56c. The brim portion 56b has a diameter larger than the head 56a. The shaft portion 56c has a diameter smaller than the brim portion 56b. The head 56a vibrates as it advances into or retreats from the first and second sound-emitting recessed portions 55a and 55b. Thus, the drag adjustment sounding mechanism 47 sounds. The sounding mechanism coil spring 57 is provided around an outer periphery of the shaft portion 56c. The sounding mechanism coil spring 57 is in a compressed state in the mounting hole 53c. An end of the sounding mechanism coil spring 57 is engaged with the brim portion 56b. An end of the brim portion 56b engages with the stepped portion of the mounting hole 53c to restrict movement in the advancing direction. An ellipse-shaped mounting hole lid member 58 includes a countersunk screw 58a. The mounting hole lid member 58 closes the mounting hole 53c. The mounting hole lid member 58 is fastened to the knob unit 53 with the countersunk screw 58a.

Referring to FIGS. 3 and 9, the intermediate positioning mechanism 52 conditionally positions the drag adjustment lever 45 at the strike position between the free position and the maximum position in the operation for pivoting the drag adjustment lever 45 clockwise in FIG. 4. On the other hand, the intermediate positioning mechanism 52 allows the drag adjustment lever 45 to freely pass in the operation for pivoting from a position beyond the intermediate position counterclockwise. In the strike position, the highest drag force used for ordinary fishing is set. That is, it is a position where the maximum practical drag force that is smaller than the maximum drag force is set. The maximum practical drag force is set to about one-third the tension limit of fishing line before fishing.

As shown in FIGS. 3 and 9, the intermediate positioning mechanism 52 includes a positioning block 80 and a positioning coil spring 81. The positioning coil spring 81 urges the positioning block 80 in the advancing or outer radial direction. The positioning block 80 is attached to the positioning cut-out portion 15f of the bearing block 15 so as to be able to advance or retreat in the radial direction. Thus, a region of the reel unit part supports the positioning block 80. The positioning block 80 includes an inclined surface 80a and a plurality of interlock protrusions 80b. The inclined surface 80a inclines leftward as viewed in FIG. 9. The interlock protrusions 80b protrude from both sides of the positioning block 80 at a bottom edge of the positioning block 80. The interlock protrusions 80b are engaged with the positioning cut-out portion 15f. When the drag adjustment lever 45 pivots from the free position side, the positioning block 80 comes in contact with a wall surface of the positioning recessed portion 53d and positions the drag adjustment lever 45 at the strike position. When the drag adjustment lever 45 is pivoted to the maximum position for cutting the fishing line, the angler presses the positioning block 80 with the tip of his finger or thumb so that the positioning block 80 is not in contact with the positioning recessed portion 53d. Thus, the drag adjustment lever 45 can pivot from the strike position to the maximum position. On the other hand, in the operation for pivoting the drag adjustment lever 45 from the maximum position side, the positioning block 80 is urged by the knob unit 53 and the positioning block automatically retreats since the inclined surface 80a is formed in the front of the positioning block 80.

The number of second sound-emitting recessed portions 55b is not limited to the two second sound-emitting recessed portions 55b. It will be apparent to one of skill in the art from this disclosure that the first and second sound-emitting recessed portions 55a and 55b may be provided in any region as long as they provide a region where the positioning block 80 of the intermediate positioning mechanism 52 is able to retreat.

Referring to FIG. 3, the free position restraining mechanism 59 is provided so as to make the drag adjustment lever 45 hard to pivot in the free position. That is, making the drag adjustment lever 45 difficult to pivot to the free position prevents an inadvertent release of the braking force on the spool 3. The free position restraining mechanism 59 includes a restraining block 85 and a restraining coil spring 86. The restraining block 85 is attached to the resistance-applying cut-out portion 15g so as to be able to advance or retreat radially. The restraining coil spring urges the restraining block 85 in the advancing direction. In contrast with the positioning block 80, the restraining block 85 is provided so as to retreat when the drag adjustment lever 45 pivots in both directions.

The following explains the braking function of the lever drag mechanism 7.

In the lever drag mechanism 7, when the drag adjustment lever 45 is pivoted from the free position, indicated by solid lines in FIG. 4, toward the maximum position, indicated by broken lines, the state shown beneath the spool shaft 2 in FIGS. 5 and 6 is switched into the state shown above the spool shaft 2. The first cam member 60 rotates by the pivoting of the drag adjustment lever 45 and the second cam member 61 moves leftward in an axial direction. In response to the movement of the drag adjustment lever 45, the pressing member 62 presses and shifts the outer race of the second bearing 31b and the spool 3 is shifted leftward in the axial direction via the third and fourth gears 19c and 19d, the disk springs 34, the fourth bearing 32b, and the hydrothermal drag mechanism 33. Consequently the brake disk 25 urged by the drag mechanism coil spring 28 also shifts leftward in the axial direction. On the other hand, the second friction disk 27 is also pressed via the spool 3 and the third bearing 32a, and shifted leftward in the axial direction. As a result, the brake disk 25 and the second friction disk 27 near the first friction disk 26. Then, when the brake disk 25 comes into contact with the first friction disk 26, which is axially immovable and non-rotatable in the line reel-out direction, a slight drag force acts on the spool 3. When the spool 3 is further pressed, the spool 3 nears the brake disk 25 in contact with the first friction disk 26, and the brake disk 25 contacts the second friction disk 27. When the drag adjustment lever 45 is then pivoted to the maximum position, the braking force is maximized and the first and second friction disks 26 and 27, which are sandwiched on the brake disk 25, yields a large drag force.

In this case, when attaining the strike position indicated by dashed lines in FIG. 4, the drag adjustment lever 45 is positioned by the intermediate positioning mechanism 52 and temporarily cannot pivot toward the maximum position side. In addition, the drag adjustment sounding mechanism 47 sounds in response to the pivoting. In this state, if the angler needs to pivot the drag adjustment lever 45 to the maximum position, he moves his finger or thumb that operates the drag adjustment lever 45 off of the drag adjustment lever 45 and presses the positioning block 80 with the distal end of the finger or thumb, thereby causing the positioning block 80 to retreat. In the state where the positioning block 80 retreats, the angler operates the drag adjustment lever 45 toward the maximum position. In this operation, since the second sound-emitting recessed portions 55b are not formed near a region corresponding to the strike position, the angler can operate the drag adjustment lever 45 in the silent state. In other words, the angler can operate the drag adjustment lever 45 in the state without resistance due to the sounding. Then, when the drag adjustment lever 45 is operated to the periphery of the maximum position where the second sound-emitting recessed portions 55b are formed, the second sound-emitting recessed portions 55b sound again.

On the other hand, when the drag adjustment lever 45 is pivoted counterclockwise in FIG. 4 to the free position, the state shown above the spool axis in FIGS. 5 and 6 is switched into the state shown beneath the spool axis. Initially, the friction disk 27 is pressed by the urging force of the return spring 49 and shifted rightward. When the friction disk 27 is shifted, since the drag mechanism coil spring 28 urges the brake disk 25 to move away from the spool 3 and away from the friction disk 27, the brake disk 25 is kept in the state where it is pressed into contact with the first friction disk 26, and the second friction disk 27 moves away from the brake disk 25. Thus, a gap is forcedly provided between the brake disk 25 and the second friction disk 27. The spool 3 is further pressed via the third bearing 32a and shifted rightward. Then, when the spool 3 moves over a predetermined distance, the brake disk 25 is engaged with the head portions 40c of the attaching pins 40, and is shifted together with the spool 3 rightward. As a result, the brake disk 25 moves away from the first friction disk 26. Thus, a gap is forcedly provided between the brake disk 25 and the first friction disk 26. This releases the braking on the spool 3. Meanwhile when the spool 3 shifts, the second cam member 61 and the pressing member 62 are pressed via the hydrothermal drag mechanism 33, the fourth bearing 32b, the disk springs 34, the third and fourth gears 19c and 19d, and the second bearing 31b, and retreats rightward. Then, when the drag adjustment lever 45 pivots in the braking releasing position, the state is switched into the state shown beneath the spool axis in FIGS. 5 and 6. The members on the left side of the disk springs 34 including the spool 3 are shifted by a distance S1. The members on the right side of the disk springs 34 including the third and the fourth gears 19c and 19d are shifted by a distance S2. Both the first and second frictions disks 26 and 27 move completely away from the brake disk 25. In this case, when the drag adjustment lever 45 is located in the region where the first and second sound-emitting recessed portions 55a and 55b are formed, the drag adjustment sounding mechanism 47 emits a clicking sound. Accordingly, a sound is not emitted in the region where the intermediate positioning mechanism 52 can be operated. In addition, in this case, even when the drag adjustment lever 45 attains the strike position, the drag adjustment lever 45 is not positioned since the positioning block 80 of the intermediate positioning mechanism 52 is pressed by the knob unit 53 and retreats. Therefore, it is possible to quickly return the drag adjustment lever 45 to the free position.

In this construction, in the operation for pivoting the drag adjustment lever 45, a sound is not emitted from the free position to the maximum position in the region where the positioning block 80 can retreat, but is emitted in another region. Accordingly, resistance due to the collision of the sound-emitting pin 56 with the sound-emitting recessed portions 55 does not arise in the region where the positioning block 80 can retreat. Therefore, even in the operation for pressing a positioning block 80, the force for operation corresponding to the resistance due to the drag adjustment sounding mechanism 47 does not increase, thus, lever operation is less prone to be disturbed. In addition, a sound can be emitted and clicking feeling can be provided except the region where the positioning block 80 can retreat.

The following explains how the dual-bearing reel is operated.

In the case of high-speed winding by the rotation transmission mechanism 6, the operation shaft 22 is pulled outwardly. Thus, the engaging member 20 engages with the first gear 19a by the urging force of the compression spring 21a. As a result, the rotation of the handle assembly 4 is transmitted to the spool 3 via the handle shaft 5, the first gear 19a, the third gear 19c, the spool shaft 2 and the lever drag mechanism 7, thereby causing the spool 3 to rotate at a high speed.

On the other hand, in the case of low-speed winding, the operation shaft 22 is pressed inwardly. Thus, the engaging member 20 engages with the second gear 19b by the urging force of the compression spring 21b. As a result, the rotation of the handle assembly 4 is transmitted to the spool 4 via the handle shaft 5, the second gear 19b, the fourth gear 19d, the spool shaft 2 and the lever drag mechanism 7, thereby causing the spool 3 to rotate at a low speed. In addition, in the case of low-speed winding, the operation shaft 22 is held in the pressed state when the stopper 23 is engaged with the groove 22a.

Moreover, in the case where the pressure in the strike position of the drag adjustment lever 45 is adjusted, the relative arrangement in the axial direction between the pressing member 62 and the second cam member 61 is changed by the adjusting knob 66. For example, when the adjusting knob 66 is rotated counterclockwise, the spool 3 moves away from the first friction disk 26 and the pressure decreases. On the contrary, when the adjusting knob 66 is rotated clockwise the spool 3 nears the first friction disk 26 and the pressure increases.

In the foregoing embodiment, the spool shaft 2 is moved in the moving mechanism 46, however, gears provided to the spool shaft, such as the third and fourth gears 19c and 19d, may be shifted to shift the brake disk 25 in response to the gears.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents. Thus, the scope of the invention is not limited to the disclosed embodiment.

What is claimed is:

1. A drag adjustment device for a dual-bearing reel comprising:
   a reel unit part;
   a drag adjustment lever configured and arranged to pivot about a spool shaft of a spool between a free position corresponding to a drag free state where the spool can freely rotate and a maximum position corresponding to a maximum drag state of a lever drag mechanism;
   an intermediate positioning mechanism including a positioning block attached to a region of the reel unit part at an intermediate position, which is between the free position and the maximum position, so as to be able to advance or retreat and so as not to rotate with the drag adjustment lever, and a spring member that urges the positioning block in an advance direction, the intermediate positioning mechanism allowing the positioning block to contact the drag adjustment lever so as to position the drag adjustment lever at the intermediate position when the drag adjustment lever is pivoted from the free position to the intermediate position, the positioning block being further configured and arranged to be pressed inward by a finger or thumb that operates the drag adjustment lever;
   a drag adjustment sounding mechanism including a portion of the reel unit part with a plurality of sound-emitting recessed portions configured and arranged to oppose the drag adjustment lever and spaced from each other at an interval in the pivot direction between the free position and the maximum position, a sound-emitting pin attached to the drag adjustment lever so as to be able to oppose the sound-emitting recessed portions and to advance or retreat, and a spring member that urges the sound-emitting pin toward the sound-emitting recessed portions, the drag adjustment sounding mechanism sounding in response to the pivoting of the drag adjustment lever, the reel unit part including a cut-out portion arranged on the region of the reel unit part along the positioning block such that the drag adjustment lever operates in a silent state with reduced frictional movement and no sound being emitted from the drag adjustment sounding mechanism during movement of the drag adjustment lever along the region of the reel unit part along the positioning block in that the sound emitting pin does not oppose the sound-emitting recessed portions in the silent state.

2. The drag adjustment device for a dual-bearing reel as set forth in claim 1, wherein
   the positioning block retreats by pressing the drag adjustment lever when the drag adjustment lever is operated from the maximum position toward the free position.

3. A dual-bearing reel comprising:
   a reel unit having a cylindrical reel body;

a spool disposed inside the reel unit;

a first side plate that covers one end of the reel body;

a second side plate that covers another end of the reel body;

a drag adjustment device including:

a drag adjustment lever configured and arranged to pivot about a spool shaft of the spool between a free position corresponding to a drag free state where the spool can freely rotate and a maximum position corresponding to a maximum drag state of a lever drag mechanism, the drag adjustment lever being pivotably attached to the second side plate, an intermediate positioning mechanism including a positioning block attached to a region of the reel unit at an intermediate position, which is between the free position and the maximum position, so as to be able to advance or retreat and so as not to move with the drag adjustment lever, and a spring member that urges the positioning block in an advance direction, the intermediate positioning mechanism allowing the positioning block to contact the drag adjustment lever so as to position the drag adjustment lever at the intermediate position when the drag adjustment lever is pivoted from the free position to the intermediate position, the positioning block being further configured and arranged to be pressed inward by a finger or thumb that operates the drag adjustment lever, and a drag adjustment sounding mechanism including a portion of the reel unit with a plurality of sound-emitting recessed portions configured and arranged to oppose the drag adjustment lever and spaced from each other at an interval in the pivot direction between the free position and the maximum position, a sound-emitting pin attached to the drag adjustment lever so as to be able to oppose the sound-emitting recessed portions and to advance or retreat, and a spring member that urges the sound-emitting pin toward the sound-emitting recessed portions, the drag adjustment sounding mechanism sounding in response to the pivoting of the drag adjustment lever; and a plate-shaped lever guide attached to the second side plate so as to protrude in an arc shape externally in the radial direction and guide the drag adjustment lever, the lever guide including a cut-out portion arranged on the region of the reel unit along the positioning block such that the drag adjustment lever operates in a silent state with reduced frictional movement and no sound being emitted from the drag adjustment sounding mechanism during movement of the drag adjustment lever along the region of the reel unit along the positioning block in that the sound emitting pin does not oppose the sound-emitting recessed portions in the silent state.

4. The dual-bearing reel as set forth in claim 3, further comprising a moving mechanism for moving the spool in an axial direction relative to a rotary shaft of the spool by the pivoting of the drag adjustment lever.

5. The dual-bearing reel as set forth in claim 3, wherein the positioning block retreats by pressing the drag adjustment lever when the drag adjustment lever is operated from the maximum position toward the free position.

6. The dual-bearing reel as set forth in claim 5, wherein the sound-emitting recessed portions are through holes that are formed in the lever guide so as to be spaced at an interval from each other in the pivot direction.

7. The dual-bearing reel as set forth in claim 5, further comprising a moving mechanism for moving the spool in an axial direction relative to a rotary shaft of the spool by the pivoting of the drag adjustment lever.

8. The dual-bearing reel as set forth in claim 3, wherein the sound-emitting recessed portions are through holes that are formed in the lever guide so as to be spaced at an interval from each other in the pivot direction.

* * * * *